(12) United States Patent
Watanabe et al.

(10) Patent No.: US 9,483,418 B2
(45) Date of Patent: Nov. 1, 2016

(54) STORAGE SYSTEM, VIRTUALIZATION CONTROL APPARATUS, INFORMATION PROCESSING APPARATUS, AND METHOD FOR CONTROLLING STORAGE SYSTEM

(71) Applicant: FUJITSU LIMITED, Kawasaki-shi, Kanagawa (JP)

(72) Inventors: Sugio Watanabe, Kawasaki (JP); Atsushi Tabei, Yokohama (JP); Hideaki Takahashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 339 days.

(21) Appl. No.: 13/960,490

(22) Filed: Aug. 6, 2013

(65) Prior Publication Data

US 2014/0068217 A1 Mar. 6, 2014

(30) Foreign Application Priority Data

Aug. 31, 2012 (JP) ................. 2012-191135

(51) Int. Cl.
G06F 12/14 (2006.01)
G06F 3/06 (2006.01)
G06F 12/00 (2006.01)

(52) U.S. Cl.
CPC ......... G06F 12/1483 (2013.01); G06F 3/0607 (2013.01); G06F 3/067 (2013.01); G06F 3/0635 (2013.01); G06F 3/0647 (2013.01); G06F 12/14 (2013.01)

(58) Field of Classification Search
CPC .................................................. G06F 12/14
USPC ........................................... 711/163
See application file for complete search history.

(56) References Cited

U.S. PATENT DOCUMENTS 7,783,779 B1 * 8/2010 Scales .................. G06F 9/5077
709/207
2002/0016792 A1 * 2/2002 Ito ........................ G06F 3/0601
2003/0212854 A1 11/2003 Kitamura et al.
(Continued)

FOREIGN PATENT DOCUMENTS

| EP | 1 310 876 A1 | 5/2003 |
|---|---|---|
| JP | 2001-331355 | 11/2001 |
| JP | 2004-46661 | 2/2004 |
| JP | 2004-227558 | 8/2004 |

OTHER PUBLICATIONS

Patent Abstracts of Japan, Publication No. 2004-046661, Published Feb. 12, 2004.

(Continued)

*Primary Examiner* — Yaima Rigol
*Assistant Examiner* — Gautam Sain
(74) *Attorney, Agent, or Firm* — Staas & Halsey LLP

(57) ABSTRACT

An information processing apparatus is configured to make access to a storage device via a first path. A virtualization control apparatus is configured to control access to a virtual storage device via a second path, where the virtual storage device is provided by virtualizing the storage device. The virtualization control apparatus sends an identifier of the storage device in response to a query from the information processing apparatus which requests information about a storage space that is accessible via the second path. The information processing apparatus incorporates the second path as an inactive standby path when the identifier received as a response to the query matches with an identifier of the storage device accessible via the first path.

11 Claims, 27 Drawing Sheets

(56) References Cited

U.S. PATENT DOCUMENTS

| | | |
|---|---|---|
| 2004/0010654 A1 | 1/2004 | Yasuda et al. |
| 2009/0254695 A1* | 10/2009 | Deguchi ............... G06F 3/061 711/100 |
| 2012/0036330 A1* | 2/2012 | Saito .................... G06F 3/0617 711/162 |
| 2012/0054460 A1* | 3/2012 | Dai ..................... H04L 67/1097 711/165 |
| 2013/0054846 A1* | 2/2013 | Chaurasia ............. G06F 3/0617 710/38 |

OTHER PUBLICATIONS

Patent Abstracts of Japan, Publication No. 2001-331355, Published Nov. 30, 2001.
Japanese Office Action mailed Feb. 16, 2016 in corresponding Japanese Patent Application No. 2012-191135, 3 pages.

* cited by examiner

FIG. 4 t1 VOLUME MANAGEMENT TABLE

| MULTIPATH IDENTIFIER | PATH IDENTIFIER | STORAGE DEVICE IDENTIFIER | VOLUME IDENTIFIER |
|---|---|---|---|
| MP0 | P11 (ACT) | St0 | V0 |
|  | P12 (STB) |  |  |

FIG. 6 t1-1 VOLUME MANAGEMENT TABLE

| MULTIPATH IDENTIFIER | PATH IDENTIFIER | STORAGE DEVICE IDENTIFIER | VOLUME IDENTIFIER |
|---|---|---|---|
| MP1 | P1 (ACT) | St1 | VOL1 |
|  | P2 (STB) |  | VOL2 |

FIG. 7 t2 VOLUME MANAGEMENT TABLE

| STORAGE DEVICE IDENTIFIER | SERVER IDENTIFIER | VOLUME IDENTIFIER | REAL STORAGE DEVICE IDENTIFIER | REAL VOLUME IDENTIFIER |
|---|---|---|---|---|
| VSt1 | SV0 | VVOL1<br>VVOL2 | St1 | VOL1<br>VOL2 | t1-1 VOLUME MANAGEMENT TABLE

| MULTIPATH IDENTIFIER | PATH IDENTIFIER | STORAGE DEVICE IDENTIFIER | VOLUME IDENTIFIER |
|---|---|---|---|
| MP1 | P1 | St1 | VOL1 |
|  | P2 |  | VOL2 | t1-2 VOLUME MANAGEMENT TABLE

| MULTIPATH IDENTIFIER | PATH IDENTIFIER | STORAGE DEVICE IDENTIFIER | VOLUME IDENTIFIER |
|---|---|---|---|
| MP1 | P1 | St1 | VOL1 |
|  | P2 |  | VOL2 |
| MP2 | P3 | VSt1 | VVOL1 |
|  | P4 |  | VVOL2 | c1

FIG. 15
T10-1 VOLUME MANAGEMENT TABLE
| MULTIPATH IDENTIFIER | PATH IDENTIFIER | STORAGE DEVICE IDENTIFIER | VOLUME IDENTIFIER |
|---|---|---|---|
| MP1 | P1(ACT) | St1 | VOL1 VOL2 |
| | P2(STB) | | |
| | P3 | | |
| | P4 | | |
T10-2 VOLUME MANAGEMENT TABLE
| MULTIPATH IDENTIFIER | PATH IDENTIFIER | STORAGE DEVICE IDENTIFIER | VOLUME IDENTIFIER |
|---|---|---|---|
| MP1 | P1(ACT) | St1 | VOL1 VOL2 |
| | P2(STB) | | |
| | P3 | VSt3 | VVOL3 VVOL4 |
| | P4 | | |

FIG. 16
T10-3 VOLUME MANAGEMENT TABLE
| MULTIPATH IDENTIFIER | PATH IDENTIFIER | STORAGE DEVICE IDENTIFIER | VOLUME IDENTIFIER |
|---|---|---|---|
| MP1 | P1(ACT) | St1 | VOL1 VOL2 |
| | P2(STB) | | |
| | P3 | VSt3 | VVOL1 VVOL2 |
| | P4 | VSt3 | VVOL3 VVOL4 |
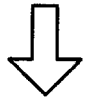
T10-4 VOLUME MANAGEMENT TABLE
| MULTIPATH IDENTIFIER | PATH IDENTIFIER | STORAGE DEVICE IDENTIFIER | VOLUME IDENTIFIER |
|---|---|---|---|
| MP1 | P1(ACT) | St1 | VOL1 VOL2 |
| | P2(STB) | | |
| MP2 | P3(ACT) | VSt3 | VVOL3 VVOL4 |
| | P4(STB) | | |

FIG. 20
T10-11    VOLUME MANAGEMENT TABLE
| MULTIPATH IDENTIFIER | PATH IDENTIFIER | STORAGE DEVICE IDENTIFIER | VOLUME IDENTIFIER |
|---|---|---|---|
| MP1 | P1(ACT) | St1 | VOL1 VOL2 |
|  | P2(STB) |  |  |
|  | P3 |  |  |
|  | P4 |  |  |
T10-12    VOLUME MANAGEMENT TABLE
| MULTIPATH IDENTIFIER | PATH IDENTIFIER | STORAGE DEVICE IDENTIFIER | VOLUME IDENTIFIER |
|---|---|---|---|
| MP1 | P1(ACT) | St1 | VOL1 VOL2 |
|  | P2(STB) |  |  |
|  | P3(STB) |  |  |
|  | P4 |  |  |

FIG. 21
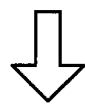
T10-13    VOLUME MANAGEMENT TABLE
| MULTIPATH IDENTIFIER | PATH IDENTIFIER | STORAGE DEVICE IDENTIFIER | VOLUME IDENTIFIER |
|---|---|---|---|
| MP1 | P1(ACT) <br> P2(STB) <br> P3(STB) <br> P4(STB) | St1 | VOL1 <br> VOL2 |
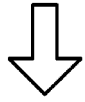
T10-14    VOLUME MANAGEMENT TABLE
| MULTIPATH IDENTIFIER | PATH IDENTIFIER | STORAGE DEVICE IDENTIFIER | VOLUME IDENTIFIER |
|---|---|---|---|
| MP1 | P1(STB) <br> P2(STB) <br> P3(ACT) <br> P4(STB) | St1 | VOL1 <br> VOL2 |
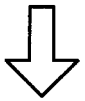

T10-15 VOLUME MANAGEMENT TABLE

| MULTIPATH IDENTIFIER | PATH IDENTIFIER | STORAGE DEVICE IDENTIFIER | VOLUME IDENTIFIER |
|---|---|---|---|
|  |  |  |  |
|  |  |  |  |
| MP1 | P3(ACT) | St1 | VOL1<br>VOL2 |
|  | P4(STB) |  |  |

FIG. 23

T20-12 VOLUME MANAGEMENT TABLE

| STORAGE DEVICE IDENTIFIER | PATH IDENTIFIER | SERVER IDENTIFIER | VOLUME IDENTIFIER | REAL STORAGE DEVICE IDENTIFIER | REAL VOLUME IDENTIFIER |
|---|---|---|---|---|---|
| VSt1 | P3 | SV1 | VVOL1 | St1 | VOL1 |
| | P4 | | VVOL2 | | VOL2 |

T20-11 VOLUME MANAGEMENT TABLE

| STORAGE DEVICE IDENTIFIER | PATH IDENTIFIER | SERVER IDENTIFIER | VOLUME IDENTIFIER | REAL STORAGE DEVICE IDENTIFIER | REAL VOLUME IDENTIFIER |
|---|---|---|---|---|---|
| VSt1 | P3 | | VVOL1 | St1 | VOL1 |
| | P4 | | VVOL2 | | VOL2 |

T20-13 VOLUME MANAGEMENT TABLE

| STORAGE DEVICE IDENTIFIER | PATH IDENTIFIER | SERVER IDENTIFIER | VOLUME IDENTIFIER | REAL STORAGE DEVICE IDENTIFIER | REAL VOLUME IDENTIFIER |
|---|---|---|---|---|---|
| VSt1 | P3 | | VVOL1 | St1 | VOL1 |
| | P4 | SV1 | VVOL2 | | VOL2 |

STORAGE SYSTEM, VIRTUALIZATION CONTROL APPARATUS, INFORMATION PROCESSING APPARATUS, AND METHOD FOR CONTROLLING STORAGE SYSTEM

CROSS-REFERENCE TO RELATED APPLICATION

This application is based upon and claims the benefit of priority of the prior Japanese Patent Application No. 2012-191135, filed on Aug. 31, 2012, the entire contents of which are incorporated herein by reference.

FIELD

The embodiments discussed herein relate to a storage system, virtualization control apparatus, information processing apparatus, and method for controlling a storage system.

BACKGROUND

Various data storage systems have been developed and deployed in recent years, which include those known as "storage area network" (SAN). A SAN is a system of storage devices such as hard disk drives (HDD) and magnetic tape drives made accessible to servers or other computers via a network. Data migration may take place in a SAN to move data from existing storage devices to new storage devices with a larger data capacity. The migration of data could be a time-consuming process because of the massive size of data that needs to be moved.

One method of data migration uses a server for virtualizing the volumes that may be accessed by host computers, so that the migration of data is transparent to those hosts. This method causes the server to run a background process to copy data from a first disk (physical space of virtual volumes) to a second disk, concurrently with its regular work of controlling access requests from hosts to virtual volumes. When the copy of data is completed, the server switches the physical space of virtual volumes, from the first disk to the second disk.

According to another method of data migration, the current storage device and a new storage device are first registered as members of a virtual unification device, and all files in the current storage device are migrated to the new storage device. The method then deregisters the current storage device from the virtual unification device upon completion of the migration.

See, for example, the following documents:
Japanese Laid-open Patent Publication No. 2001-331355
Japanese Laid-open Patent Publication No. 2004-046661

The virtualization of an existing real storage device results in a plurality of paths for a server to reach the real storage device, since new paths are produced for virtual storage devices, in addition to existing paths for access to the real storage device. Here the concurrent use of an existing access path and an added access path is inhibited to avoid possible data corruption in the real storage space. This means, however, that there exists a certain time period during which the storage device is inaccessible.

SUMMARY

According to one aspect of the embodiments, there is provided a storage system including an information processing apparatus configured to make access to a storage device via a first path; and a virtualization control apparatus configured to control access to a virtual storage device via a second path, the virtual storage device being provided by virtualizing the storage device. The virtualization control apparatus includes a first control unit configured to send an identifier of the storage device to the information processing apparatus in response to a query from the information processing apparatus which requests information about a storage space that is accessible via the second path. The information processing apparatus includes a second control unit configured to incorporate the second path as an inactive standby path when the identifier received as a response to the query matches with an identifier of the storage device accessible via the first path.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of a volume management table;
FIG. 6 illustrates an example of a volume management table of a business server;
FIG. 7 illustrates an example of a volume management table of a storage virtualization server;
FIGS. 15 and 16 illustrate how a volume management table is changed in the business server;
FIGS. 20 to 22 illustrate how a volume management table is changed in the business server;
FIG. 23 illustrates how a volume management table is changed in the storage virtualization server.

DESCRIPTION OF EMBODIMENTS

Figure 1:
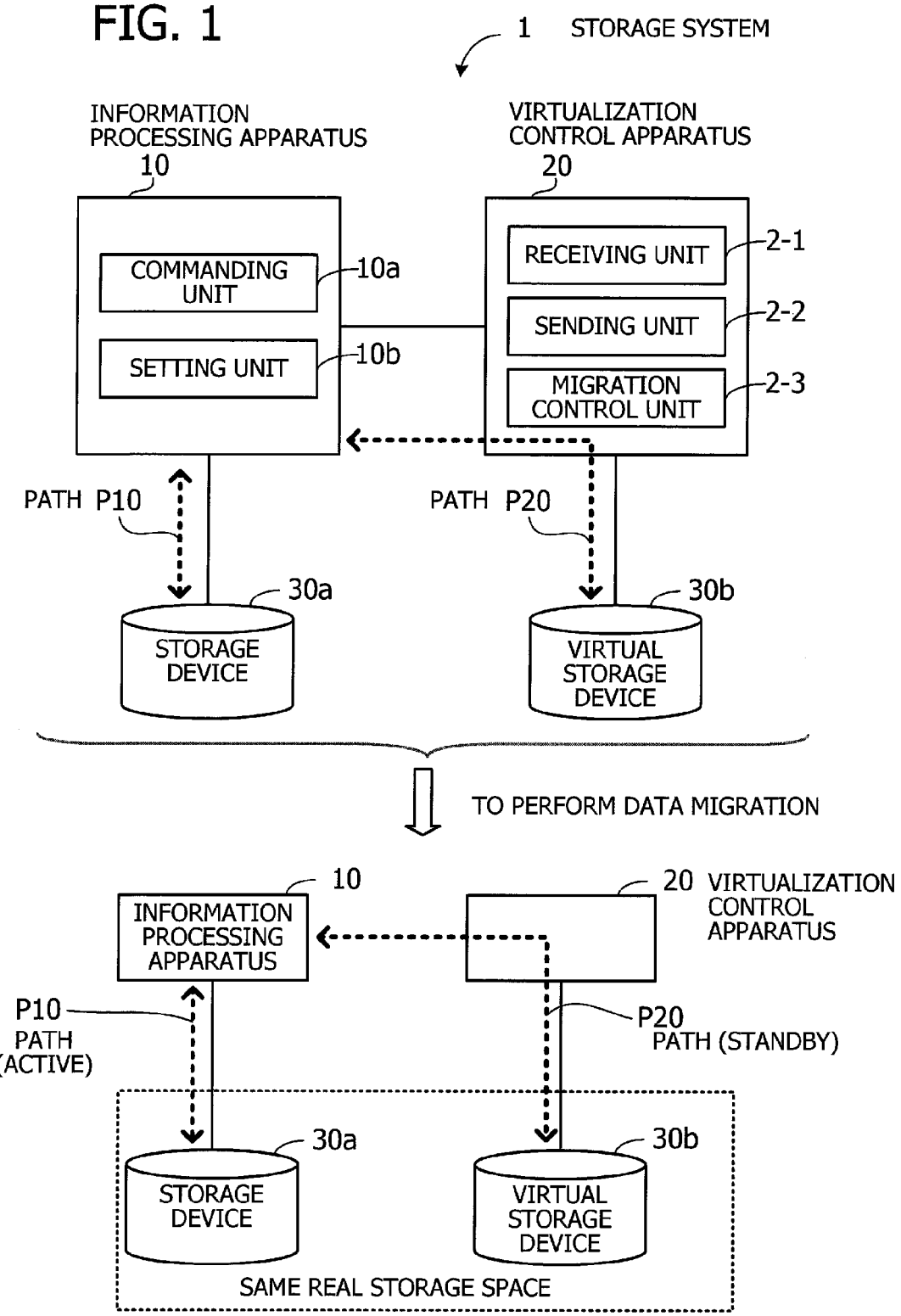
FIG. 1 illustrates an example of a storage system according to a first embodiment.

Several embodiments will be described below with reference to the accompanying drawings. FIG. 1 illustrates an exemplary structure of a storage system according to a first embodiment. The illustrated storage system 1 includes an information processing apparatus 10, a virtualization control apparatus 20, and a storage device 30a.

The storage device 30a stores data. The information processing apparatus 10 makes access to the storage device 30a via a path P10. The virtualization control apparatus 20 provides a virtual storage device 30b and controls its access. The information processing apparatus 10 is allowed to make access to this virtual storage device 30b through the virtualization control apparatus 20, using a path P20 that is different from the path P10.

More specifically, the virtualization control apparatus 20 provides the virtual storage device 30b by virtualizing a storage device 30a that is accessible to the information processing apparatus 10. That is, the whole or a part of the storage device 30a is assigned to the virtual storage device 30b as its real storage space. With this virtualization of the storage device 30a, the virtualization control apparatus 20 enables data migration from the storage device 30a to some other storage devices (not illustrated), while allowing access from the information processing apparatus 10 to the virtual storage device 30b.

As seen in FIG. 1, the information processing apparatus 10 includes a commanding unit 10a and a setting unit 10b. The virtualization control apparatus 20 includes a receiving unit 2-1, a sending unit 2-2, and a migration control unit 2-3.

It is assumed now that the virtual storage device 30b has been created for the purpose of data migration, with the storage device 30a offering a real storage space therefor. In this context, the information processing apparatus 10 adds a path P20 to the virtual storage device 30b in the following way.

The commanding unit 10a in the information processing apparatus 10 sends a query to the virtualization control apparatus 20 which requests information about a storage space that is accessible to the information processing apparatus 10 via the path P20. This query arrives at the receiving unit 2-1 in the virtualization control apparatus 20. In response, the sending unit 2-2 sends the information processing apparatus 10 an identifier of the storage device 30a as the requested information about accessible storage space. This identifier indicates the real storage space of the virtual storage device 30b.

In the information processing apparatus 10, the setting unit 10b receives the above identifier from the virtualization control apparatus 20. If the received identifier matches with the identifier of the storage device 30a accessible via an existing path P10, the setting unit 10b incorporates the additional path P20 as an inactive standby path. For example, the setting unit 10b adds this path P20 as part of a multipath route, so that the new path P20 will serve as a standby path for the existing active path P10.

Assume here that the sending unit 2-2 has instead sent an identifier of the virtual storage device 30b. The setting unit 10b in the information processing apparatus 10 would interpret the received identifier as indicating that the storage device attached to the path P20 in question is different from the one attached to the existing path P10. The setting unit 10b would thus activate the new path P20. As a result, the information processing apparatus 10 becomes able to make access to the same real storage space in the storage device 30a via two different active paths P10 and P20, meaning that some data in the real storage space could be destroyed by accident. Such data corruption might be avoided by deactivating the existing path P10 before activating a new path, but this also means that the information processing apparatus 10 would be unable to make access to the storage device 30a.

The proposed storage system 1 is not like the above. That is, the sending unit 2-2 in the virtualization control apparatus 20 sends an identifier of the storage device 30a as the requested information about storage space accessible via the path P20. This identifier causes the setting unit 10b in the information processing apparatus 10 to find that another path P20 for the existing storage device 30a has been added and thus incorporate the additional path P20 with an inactive state, in order not to destroy the data in the storage device 30a. Accessibility of the storage device 30a is maintained since there is no need to deactivate the existing path P10 when adding the new path P20.

After incorporating the second path P20 as an inactive standby path, the setting unit 10b changes the first path P10 to an inactive standby path and renders the second path P20 active. This operation puts the storage device 30a under a virtual environment provided by the virtualization control apparatus 20. In this virtual environment, the information processing apparatus 10 makes access to the virtual storage device 30b via the second path P20. It is preferable to stop access from the information processing apparatus 10 to the storage device 30a at the moment when switching active paths. There is no need, however, to stop such access until that switching point is reached. That is, the above processing reduces the duration of inaccessibility associated with the virtualization of the storage device 30a.

Since the storage device 30a is now under a virtual environment, the migration control unit 2-3 in the virtualization control apparatus 20 executes data migration from the storage device 30a to a destination storage device (not illustrated) while permitting the information processing apparatus 10 to continue access to the virtual storage device 30b. Upon completion of the data migration, the migration control unit 2-3 changes the assignment of real storage space for the virtual storage device 30b, from the original storage device 30a to the destination storage device. This marks the end of the entire process of data migration. While it takes time to complete data migration, the operation of the information processing apparatus 10 is not affected because interruption of its access to the storage device 30a is minimized.

Figure 2:
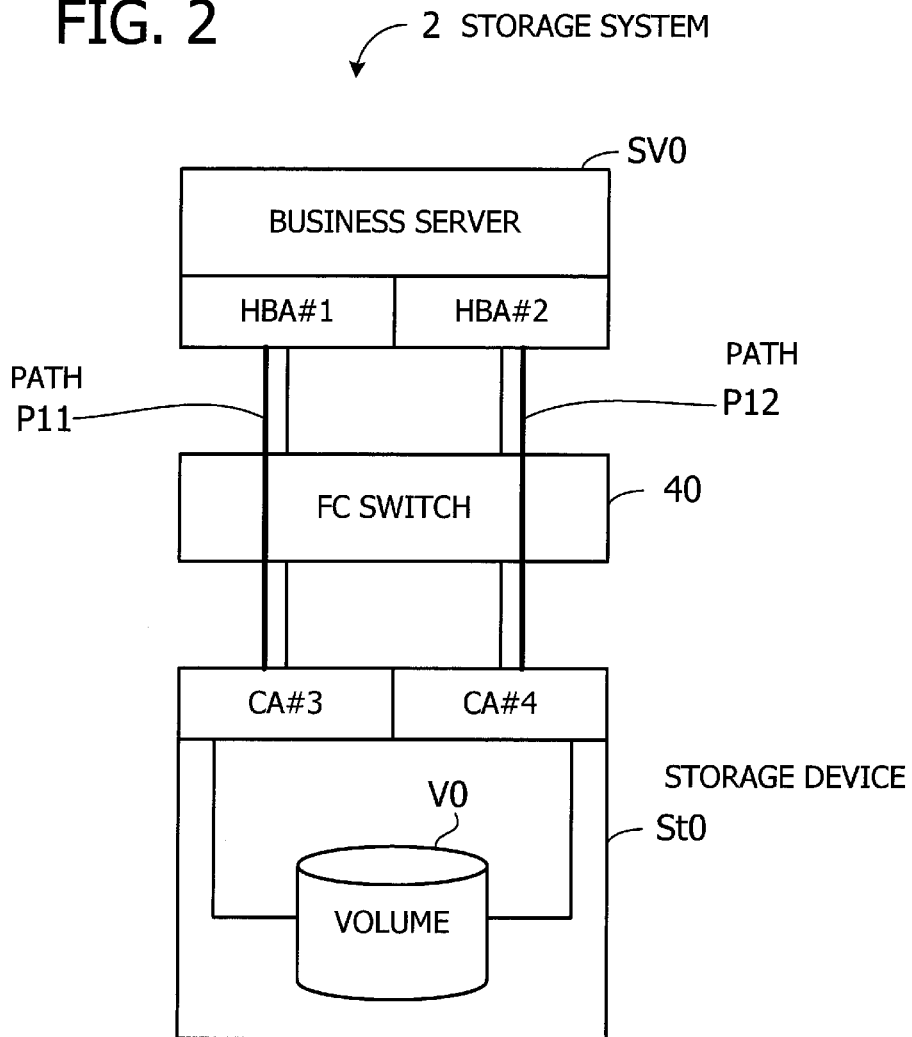
FIG. 2 illustrates an exemplary storage system with a multipath route for reference purposes.

The following section describes multipath configuration of a storage system as background information for a second embodiment that is described later. FIG. 2 illustrates an exemplary storage system with a multipath route for reference purposes. The illustrated storage system 2 includes a business server SV0, a Fibre Channel (FC) switch 40, and a storage device St0. The business server SV0 includes two Host Bus Adapters (HBA) #1 and #2, while the storage device St0 includes two Channel Adapters (CA) #3 and #4. These HBAs and CAs enable communication over the FC links. In the storage device St0, a volume V0 is provided as a storage space accessible to external devices.

HBA#1 and HBA#2 are interface devices for the business server SV0 to send data to and receive data from external devices. HBA#1 and HBA#2 are connected to the FC switch 40, as are CA#3 and CA#4. Volume V0 in the storage device St0 are coupled to both CA#3 and CA#4.

Path P11 is one route for the business server SV0 to make access to volume V0 via HBA#1 and CA#3. Path P12 is another route for the business server SV0 to make access to volume V0 via HBA#2 and CA#4.

The above-described paths in the storage system 2 are an example of a multipath configuration which provides, in general, duplexed (redundant) access routes to a single storage device. The multipath configuration makes the system tolerant of a path fault, thus enhancing the reliability of access to the storage devices.

In the example of FIG. 2, the access paths P11 and P12 may both be defined for free use by the business server SV0. In that case, however, the business server SV0 could mistakenly recognize a single volume V0 in the storage device St0 as two separate volumes coupled respectively to CA#3 and CA#4. The business server SV0 might change, under this condition, data in volume V0 by using the two paths P11 and P12 at the same time, which could result in destruction of data in the volume V0 being accessed. Multiple-path storage systems avoid such situations by using, for example, active-standby control described below.

Figure 3:
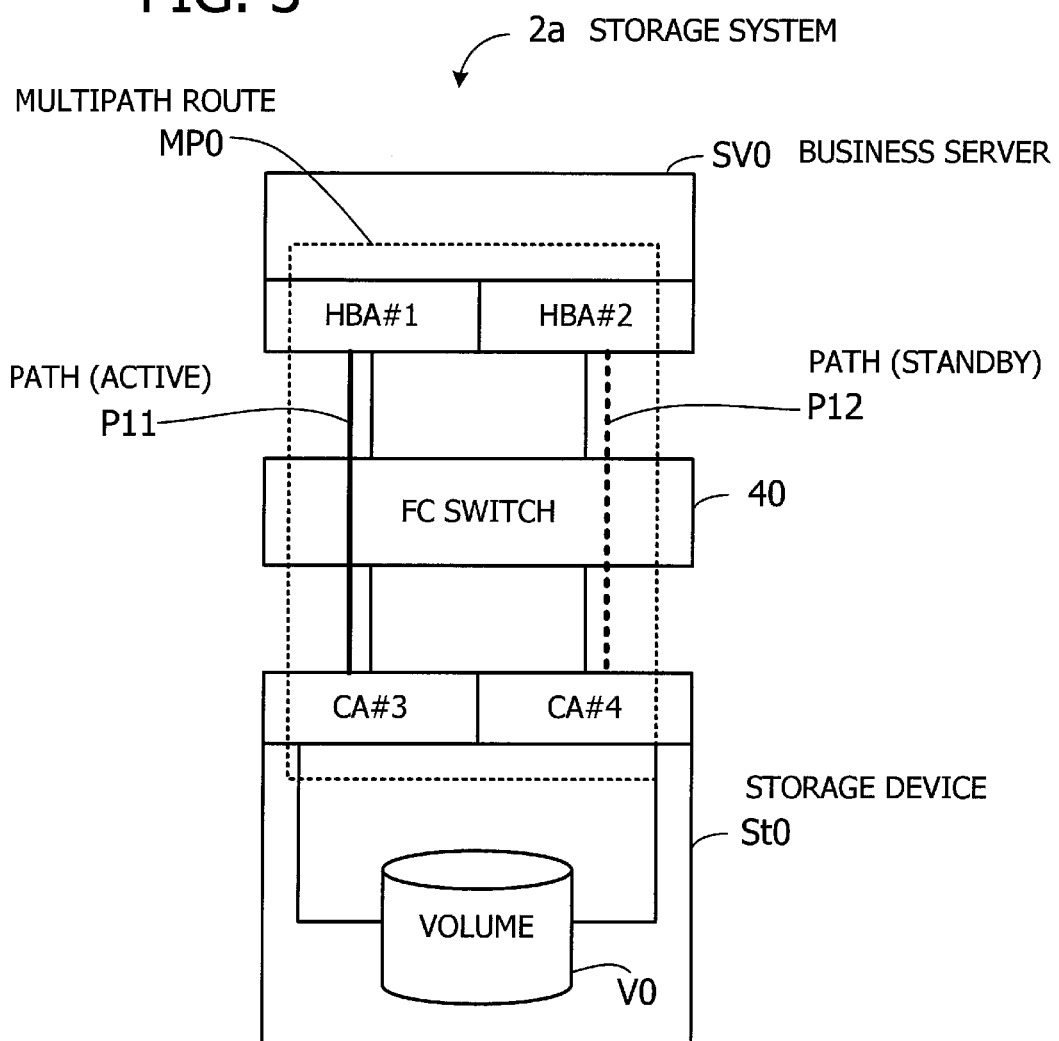
FIG. 3 illustrates a storage system having active and standby paths.

FIG. 3 illustrates a storage system having active and standby paths. A multipath route MP0 has been established with two paths P11 and P12 in the illustrated storage system 2a. For example, one path P11 is designated as an active path while the other path P12 is designated as a standby path. This configuration of active and standby paths prevents the business server SV0 from making simultaneous access via two paths P11 and P12.

The above-described multipath control ensures that each volume is recognized as a single volume even if it has two different paths for access. To achieve this feature, the multipath control has to manage the information about access paths and their associated volumes.

FIG. 4 illustrates an example of a volume management table. The illustrated volume management table t1 resides in the business server SV0 and contains information for the purposes of multipath control. This volume management table t1 is formed from, for example, the following data fields: "Multipath Identifier," "Path Identifier," "Storage Device Identifier," and "Volume Identifier."

The multipath identifier field contains information that designates a specific multipath route. The path identifier field contains information indicating individual paths constituting the multipath route. The storage device identifier field contains information indicating which storage device can be accessed by the business server through the multipath route in question, and the volume identifier field contains information for identifying each volume in that storage device. Volume identifiers are unique at least within a storage device.

Referring to FIG. 4, the illustrated record includes a multipath identifier "MP0," path identifiers "P11" and "P12," a storage device identifier "St0," and a volume identifier "V0." The path identifier field in FIG. 4 also indicates whether the path in question is in active state or in standby state. More specifically, the active path is designated by a symbol "ACT" in parentheses, as is the standby path by another symbol "STB." In the example of FIG. 4, path P11 is selected as the active path, and path P12 as the standby path.

The above pieces of information in the volume management table t1 are loaded into memory of the business server SV0 when, for example, the system is rebooted, or when the configuration data of the system is reloaded.

The next section will describe virtualization of data storage in a physical storage device. Storage systems may support the need for migrating data from one storage device to another storage device to increase the capacity of data storage with new HDDs or disk arrays. The process of data migration may be very time-consuming. For example, it may take 100 hours to migrate data of several tens of terabytes.

Storage virtualization is used as a method for such data migration. This method permits data migration to be performed in parallel with regular services of the system. That is, it is possible to migrate data while continuing daily business operations.

The term "storage virtualization" refers to a technique for providing a virtual environment in which a business server makes access to storage devices through a virtualization server, so that the actual access goes not directly to a real storage space, but to a virtual storage space (e.g., to a virtual volume in a virtual storage device). In such a virtual environment, the storage virtualization server can change or expand the real storage area at its own discretion, while allowing the business server to access a virtual storage space under the control of the virtualization server.

Figure 5:
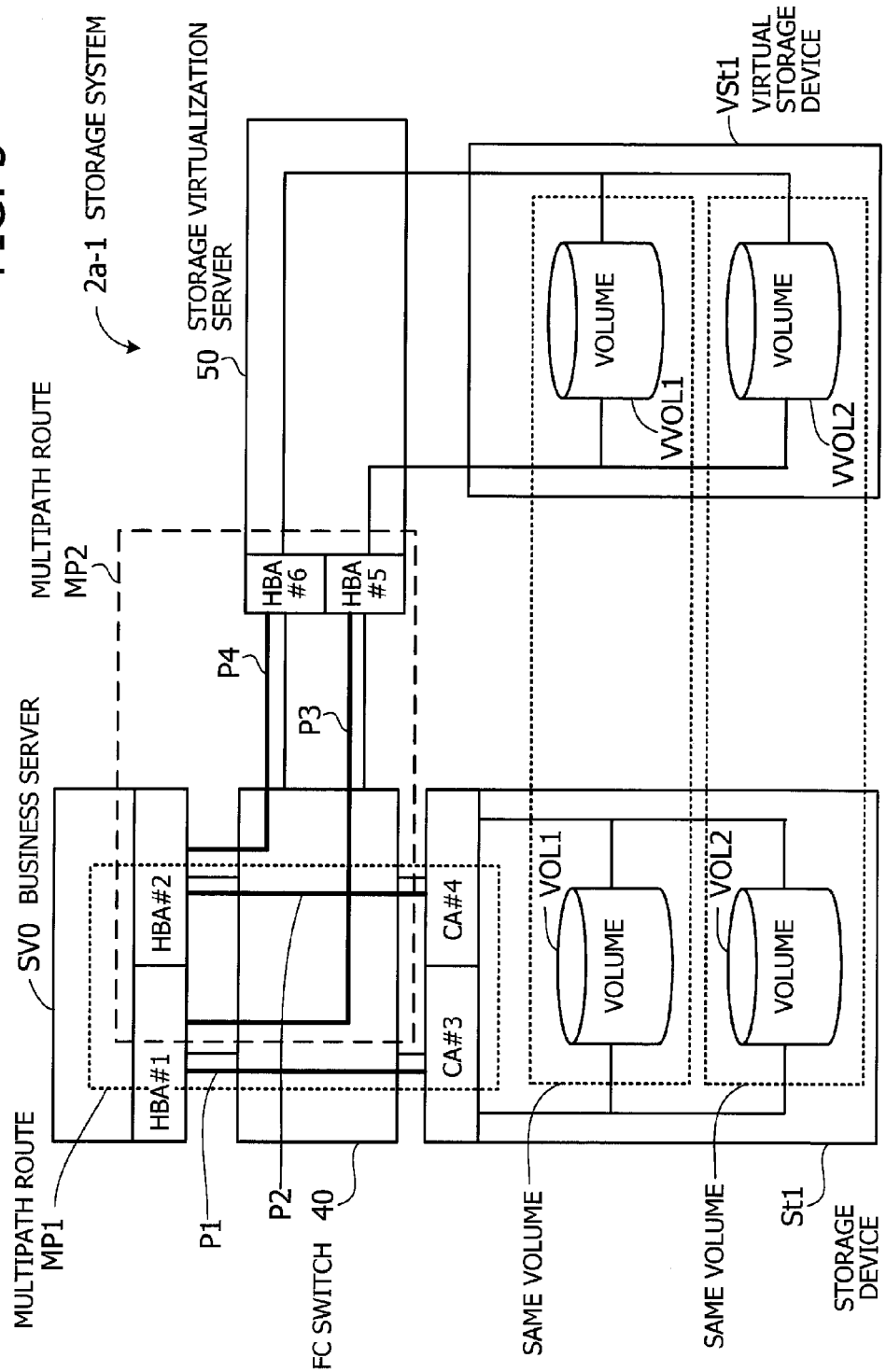
FIG. 5 illustrates an example of a storage system with a storage virtualization server.

FIG. 5 illustrates an example of a storage system with a storage virtualization server. The illustrated storage system 2a-1 includes a business server SV0, an FC switch 40, a storage virtualization server 50, and a storage device St1. The components are connected with each other via FC cables or other media.

The business server SV0 includes two HBAs #1 and #2, while the storage device St1 includes two CAs #3 and #4. Two volumes VOL1 and VOL2 are resident in the storage device St1 as storage spaces available for access from external devices.

The storage virtualization server 50 includes two HBAs #5 and #6. The storage virtualization server 50 provides a virtual storage device VSt1 and controls access thereto. This virtual storage device VSt1 has been assigned a storage device St1 as its real storage space.

Two virtual volumes VVOL1 and VVOL2 are set up in the virtual storage device VSt1. The real storage space of one virtual volume VVOL1 matches with volume VOL1, and that of another virtual volume VVOL2 matches with volume VOL2. In other words, the virtual volumes VVOL1 and VVOL2 are a virtualized version of volumes VOL1 and VOL2, respectively.

HBA#1 and HBA#2 are connected to the FC switch 40, as are CA#3, CA#4, HBA#5, and HBA#6. In the storage device St1, volumes VOL1 and VOL2 are connected to both CA#3 and CA#4. Similarly, virtual volumes VVOL1 and VVOL2 are connected to both HBA#5 and HBA#6 in the virtual storage device VSt1.

Path P1 is a route for the business server SV0 to make access to volumes VOL1 and VOL2 via HBA#1 and CA#3. Path P2 is a route for the business server SV0 to make access to volumes VOL1 and VOL2 via HBA#2 and CA#4. These two paths P1 and P2 constitute a multipath route MP1.

Path P3 is a route for the business server SV0 to make access to virtual volumes VVOL1 and VVOL2 via HBA#1 and HBA#5. Path P4 is a route for the business server SV0 to make access to virtual volumes VVOL1 and VVOL2 via HBA#2 and HBA#6. These two paths P3 and P4 constitute another multipath route MP2.

The above-described system integration including a storage virtualization server 50 enables the business server SV0 to use additional access paths to the storage device St1. That is, each storage space of volumes VOL1 and VOL2 is made available for access, not only via direct paths to the storage device St1, but also via the storage virtualization server 50. From the viewpoint of the business server SV0, the storage space of volumes VOL1 and VOL2 appears to be another set of volumes VVOL1 and VVOL2 on the multipath route MP2.

Data in volumes VOL1 and VOL2, however, could be corrupted if both multipath routes MP1 and MP2 were enabled. To avoid such data corruption, the storage system 2a-1 may be configured as a virtual environment in which, for example, one multipath route MP2 is in active use while the other multipath route MP1 is a standby.

FIG. 6 illustrates an example of a volume management table t1-1 managed in the business server SV0 discussed in FIG. 5. What is seen in this volume management table t1-1 is its initial content before the storage virtualization server 50 is integrated into the system. More specifically, the volume management table t1-1 indicates that the business server SV0 has established a multipath route MP1 for a storage device St1, that the multipath route MP1 includes two paths P1 and P2 both connected to volumes VOL1 and VOL2, and that these paths P1 and P2 are respectively designated as active and standby paths.

FIG. 7 illustrates an example of a volume management table t2 managed in the storage virtualization server 50 discussed in FIG. 5. The illustrated volume management table t2 is formed from the following data fields: "Storage Device Identifier," "Server Identifier," "Volume Identifier," "Real Storage Device Identifier," and "Real Volume Identifier."

The storage device identifier field contains an identifier of a virtual storage device, and the server identifier field indicates which business server is connected to the virtualization server. The volume identifier field contains identifiers of individual virtual volumes established in the virtual storage device. Volume identifiers are unique at least within a virtual storage device. The real storage device identifier field contains an identifier that indicates a real storage device assigned to the virtual storage device. The real storage device accommodates some volumes whose real storage space is shared with virtual volumes in the virtual storage device. The real volume identifier field contains identifiers of such real volumes in the real storage device.

Referring to FIG. 7, the illustrated record contains a storage device identifier "VSt1," a server identifier "SV0," two volume identifiers "VVOL1" and "VVOL2," a real storage device identifier "St1," and two real volume identifiers "VOL1" and "VOL2." As seen, two virtual volumes and their corresponding real volumes are registered in this record. Specifically, virtual volume VVOL1 is mapped on real volume VOL1, and virtual volume VVOL2 is mapped on real volume VOL2.

As mentioned previously, volumes in a virtual storage device may be subjected to the striping or concatenation, so that servers can recognize a plurality of storage spaces as a single volume. For this reason, virtual volumes are designated by their own identifiers that are different from those of real volumes. Such bundling of volumes may also take place across different storage devices. To this end, virtual storage devices are assigned their own identifiers distinguishable from those of real storage devices.

The above system is designed to perform a procedure to integrate a storage virtualization server 50 and set up paths P3 and P4 using the same. For example, the following actions (1) to (9) are performed in the stated order.

(1) The business server SV0 stops its service and puts the current multipath route MP1 into an inactive state. This route deactivation prevents a volume in a single real storage space from being written via two multipath routes MP1 and MP2 when a storage virtualization server 50 is integrated.

(2) The business server SV0 configures itself to incorporate a storage virtualization server 50 into the network.

(3) The business server SV0 sets up paths P3 and P4 to a virtual storage device VSt1 via the storage virtualization server 50.

(4) The business server SV0 sends a query to the storage virtualization server 50 to request storage information relating to the newly added path P3. This storage information is supposed to indicate what storage space is available for access through the specified path. For example, the storage information may be a combination of a storage device identifier and a volume identifier.

(5) The storage virtualization server 50 returns a response to the business server SV0, thus providing storage information for the path P3. According to FIG. 7, the storage information includes the following two sets of identifiers: (i) storage device identifier "VSt1" and volume identifier "VVOL1," and (ii) storage device identifier "VSt1" and volume identifier "VVOL2." These pieces of storage information may also be expressed as follows: (VSt1, VVOL1) and (VSt1, VVOL2).

(6) The business server SV0 registers the received storage information in its volume management table.

(7) The business server SV0 compares the storage information just received from the storage virtualization server 50 with the existing storage information in the volume management table, in terms of the combination of storage device identifiers and volume identifiers. At the moment, there is no match with the storage information received from the storage virtualization server 50, since the current storage information managed by the business server SV0 is (St1, VOL1) and (St1, VOL2) as seen in FIG. 6.

(8) The business server SV0 repeats the above steps (4) to (7) to register storage information of another path P4 until it finds identical storage information in the volume management table. When there is found an identical piece of storage information, the business server SV0 produces a new multipath route by bundling the paths corresponding to such storage information.

In the present example, the business server SV0 combines two paths P3 and P4 into a multipath route MP2 as a result of the above steps (4) to (7) for path P4. The business server SV0 activates this new multipath route MP2. One of the paths P3 and P4 is put into active state, and the other is put into standby state. Because multipath route MP1 has been inactive as described above, there is no chance for the storage device St1 to receive access via a plurality of paths.

(9) The business server SV0 now resumes its service. Then in parallel with the resumed service, the business server SV0 connects the new storage device and performs data migration from the existing storage device St1 to the new storage device.

Figure 8:
FIG. 8 illustrates how the volume management table is changed in the business server.

FIG. 8 illustrates how the volume management table is changed in the business server SV0. What is added is a new record describing a virtual storage device VSt1 to reflect the integration of a storage virtualization server 50 and deletion of the storage device St1. More specifically, the original volume management table t1-1 in the business server SV0 has been updated with a new record c1 as seen in the new volume management table t1-2. This new record c1 indicates that the business server SV0 has established a multipath route MP2 to a virtual storage device VSt1, and that the multipath route MP2 includes two paths P3 and P4 each connected to virtual volumes VVOL1 and VVOL2. The multipath route MP2 is set to an active state, which enables the business server SV0 to make access to those virtual volumes VVOL1 and VVOL2.

As can be seen from the above, a virtual environment is established preparatory to data migration, by incorporating a virtualization server to virtualize an existing real storage device. It is desired in this case to minimize the temporary absence of services during a virtualization process.

When virtualizing an existing real storage device, the above-described virtualization server gives a different storage name to the resulting virtual storage device to distinguish it from the real storage device. The business server therefore recognizes the virtual storage device as being different from the existing storage device, despite the fact that these storage devices actually share the same real storage space. The business server consequently specifies the virtual storage paths as active paths.

The above-described virtualization procedure adds another set of active paths for the business server to access different volumes sharing the same real storage device. To protect data in the real storage device from possible corruption, the business server has no choice but to disable its access to storage devices at the earliest stage of the virtualization procedure. The business server has therefore to stop servicing until a multipath configuration of virtual storage is completed.

In view of the above, the following second embodiment provides techniques for reducing the duration of such inaccessibility in the process of virtualization of real storage devices. That is, the second embodiment offers a storage system, path setting method, business server, and virtualization server that reduce the time of temporary absence of services.

Figure 9:
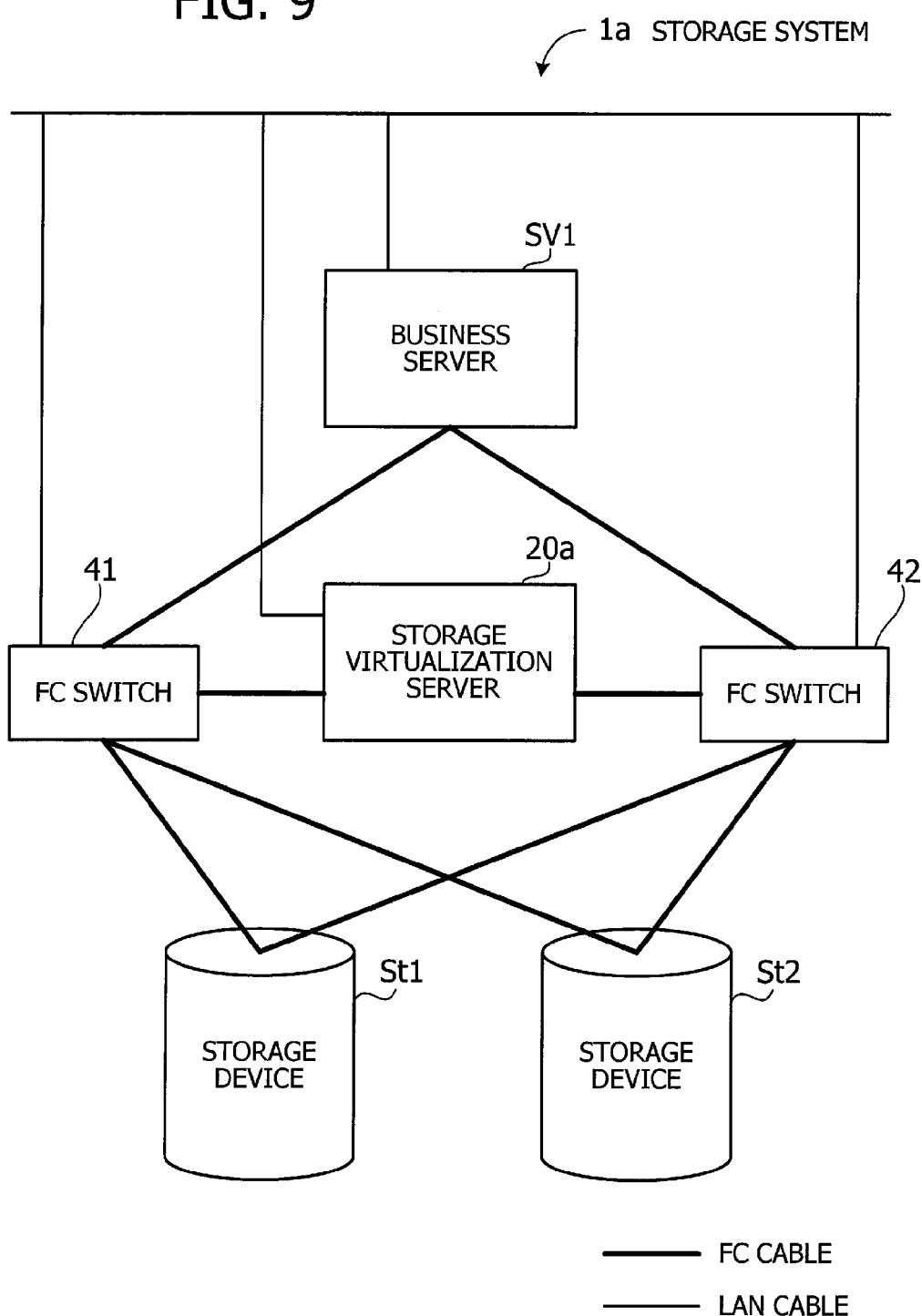
FIG. 9 illustrates an exemplary configuration of a storage system.

The next section describes a structure and operation of a storage system according to the second embodiment. FIG. 9 illustrates an exemplary configuration of a storage system 1a, which includes a business server SV1, a storage virtualization server 20a, FC switches 41 and 42, and a pair of storage devices St1 and St2.

Each storage device St1 and St2 may be formed from a plurality of HDDs. One storage device St1 is a source storage device of data migration. Currently, a real volume resides in this storage device St1 for access from the business server SV1. The other storage device St2 is a destination storage device for data migration, to which the data will be moved from the source storage device St1. The storage device St2 may be added to the storage system 1a after completion of virtualization (described later) of the storage device St1.

The illustrated FC links permit the business server SV1 to make access to the storage device St1 via one FC switch 41, as well as via the other FC switch 42. The business server SV1 is also allowed to make access to the storage virtualization server 20a via the former FC switch 41, as well as via the latter FC switch 42.

The illustrated FC links permit the storage virtualization server 20a to make access to the storage device St1 via one FC switch 41, as well as via the other FC switch 42. The storage virtualization server 20a is also allowed to make access to the storage device St2 via one FC switch 41, as well as via the other FC switch 42.

Write data to and read data from the storage devices St1 and St2 is transferred over FC cables, whereas control data between the business server SV1 and the FC switches 41 and 42 is transferred over local area network (LAN) cables. The LAN is also used to exchange control data between the business server SV1 and storage virtualization server 20a.

Figure 10:
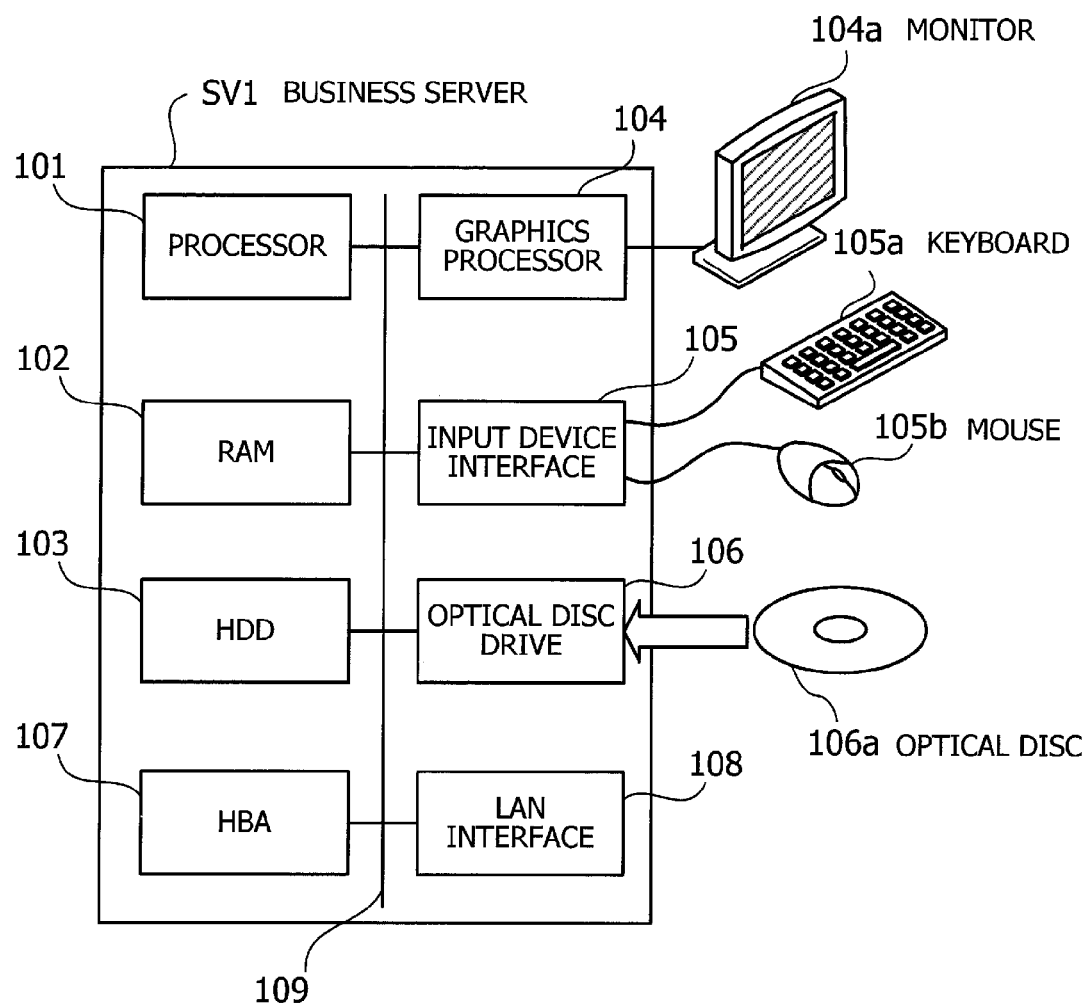
FIG. 10 illustrates an exemplary hardware configuration of a business server.

FIG. 10 illustrates an exemplary hardware configuration of a business server. For example, the business server SV1 is implemented on a computer as seen in FIG. 10. This control business server SV1 has a processor 101 to control its entire operation. The processor 101 is connected to a random access memory (RAM) 102 and other various devices and interfaces on a bus 109. The processor 101 may be a single processing device or a multiprocessor system including two or more processing devices. For example, the processor 101 may be a central processing unit (CPU), micro-processing unit (MPU), digital signal processor (DSP), application-specific integrated circuit (ASIC), programmable logic device (PLD), or any combinations of those processing devices.

The RAM 102 serves as primary storage of the business server SV1. Specifically, the RAM 102 is used to temporarily store at least some of the operating system (OS) programs and application programs that the processor 101 executes, in addition to various data objects that it manipulates at runtime.

Other devices on the bus 109 include an HDD 103, a graphics processor 104, an input device interface 105, an optical disc drive 106, an HBA 107, and a LAN interface 108.

The HDD 103 writes and reads data magnetically on its internal platters. The HDD 103 serves as secondary storage of the business server SV1 to store program and data files of the operating system and applications. Flash memory and other semiconductor memory devices may also be used as secondary storage, similarly to the HDD 103.

The graphics processor 104, coupled to a monitor 104a, produces video images in accordance with drawing commands from the processor 101 and displays them on a screen of the monitor 104a. The monitor 104a may be, for example, a cathode ray tube (CRT) display or a liquid crystal display.

The input device interface 105 is connected to input devices such as a keyboard 105a and a mouse 105b and supplies signals from those devices to the processor 101. The mouse 105b is a pointing device, which may be replaced with other kinds of pointing devices such as touchscreen, tablet, touchpad, and trackball.

The optical disc drive 106 reads out data encoded on an optical disc 106a, by using laser light. The optical disc 106a is a portable data storage medium, the data recorded on which can be read as a reflection of light or the lack of the same. The optical disc 106a may be a digital versatile disc (DVD), DVD-RAM, compact disc read-only memory (CD-ROM), CD-Recordable (CD-R), or CD-Rewritable (CD-RW), for example.

The HBA 107 is an FC interface device for communication with remote devices via FC cables. The business server SV1 actually has two such HBAs, which will be referred to as HBA#1 and HBA#2 in later sections. Specifically, HBA#1 is connected to one FC switch 41 while HBA#2 is connected to another FC switch 42. The LAN interface 108 is an interface device for communication with remote devices via LAN cables.

The business server SV1 is implemented on such a hardware platform. The same hardware configuration of FIG. 10 may similarly be used to implement the foregoing storage virtualization server 20a.

Figure 11:
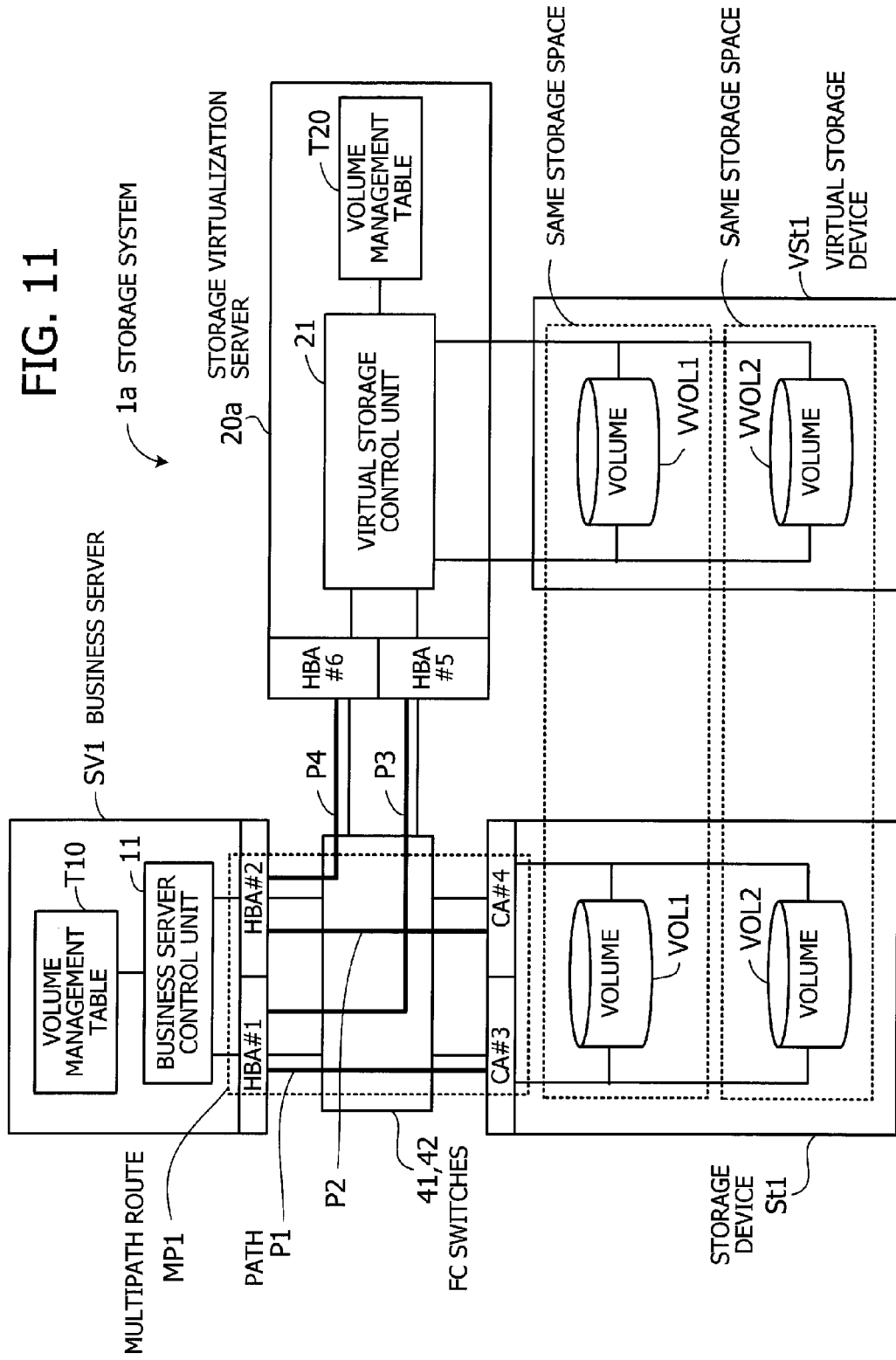
FIG. 11 illustrates an exemplary configuration of functions implemented in the business server and virtualization server, together with an exemplary setup of paths and volumes.

FIG. 11 illustrates an exemplary configuration of functions implemented in the proposed business server and virtualization server, together with an exemplary setup of paths and volumes. The business server SV1 in FIG. 11 corresponds to the information processing apparatus 10 discussed in FIG. 1. The storage virtualization server 20a in FIG. 11 corresponds to the virtualization control apparatus 20 in FIG. 1. Further, the storage device St1 in FIG. 11 corresponds to the storage device 30a in FIG. 1, and the virtual storage device VSt1 in FIG. 11 corresponds to the virtual storage device 30b in FIG. 1.

The business server SV1 includes a business server control unit 11, two HBAs #1 and #2, and a volume management table T10. The processing functions of the business server control unit 11 are realized by, for example, causing the processor in the business server SV1 to execute an appropriate program, with a volume management table T10 stored in RAM of the business server SV1.

The storage virtualization server 20a, on the other hand, includes a virtual storage control unit 21, HBAs #5 and #6, and a volume management table T20. The processing functions of the virtual storage control unit 21 are realized by, for example, causing the processor in the storage virtualization server 20a to execute an appropriate program, with a volume management table T20 stored in RAM of the storage virtualization server 20a.

The storage device St1 includes two CAs #3 and #4. HBA#1 is connected to CA#3 and HBA#5 via one FC switch 41. HBA#2 is connected to CA#4 and HBA#6 via another FC switch 42. Two volumes VOL1 and VOL2 are resident in the storage device St1 as storage space available for access from external devices. Both volumes VOL1 and VOL2 are connected to HBA#3 and HBA#4.

Path P1 is a route for the business server SV1 to make access to volumes VOL1 and VOL2 via HBA#1, FC switch 41, and CA#3. Path P2 is a route for the business server SV1 to make access to volumes VOL1 and VOL2 via HBA#2, FC switch 42, and CA#4. These two paths P1 and P2 constitute a multipath route MP1.

HBA#5 of the storage virtualization server 20a is connected to HBA#1 and CA#3 via one FC switch 41. HBA#6 of the same is connected to HBA#2 and CA#4 via the other FC switch 42.

The virtual storage control unit 21 in the storage virtualization server 20a is designed to provide a virtual storage device by virtualizing a real storage space of a storage device and controls access to such virtual storage devices. In the example of FIG. 11, the virtual storage control unit 21 provides a virtual storage device VSt1 by virtualizing real storage spaces of a storage device St1. The virtual storage control unit 21 also sets up virtual volumes VVOL1 and VVOL2 in the virtual storage device VSt1.

It is noted that the volume VOL1 and virtual volume VVOL1 are both associated with a real storage space in the storage device St1. Similarly, the volume VOL2 and virtual volume VVOL2 are both associated with another real storage space in the storage device St1. In other words, virtual volumes VVOL1 and VVOL2 are a virtualized version of volumes VOL1 and VOL2, respectively.

Path P3 is a route for the business server SV1 to make access to virtual volumes VVOL1 and VVOL2 via HBA#1, FC switch 41, and HBA#5. Path P4 is a route for the business server SV1 to make access to virtual volumes VVOL1 and VVOL2 via HBA#2, FC switch 42, and HBA#6. The storage system 1a may combine these paths P3 and P4 into a new multipath route, aside from the existing multipath route MP1. Another option is to incorporate these paths P3 and P4 into the existing multipath route MP1 as will be described later.

The above-described integration of a storage virtualization server 20a enables the business server SV1 to use additional access paths to the storage device St1. That is, each storage space of volumes VOL1 and VOL2 in the storage device St1 may be accessed via the storage virtualization server 20a. When this is the case, the business server SV1 recognizes the storage space of volumes VOL1 and VOL2 as volumes VVOL1 and VVOL2 on the paths P3 and P4.

The business server control unit 11 in the business server SV1 may make access to volumes in a storage device, as well as to virtual volumes in a virtual storage device. To this end, the business server SV1 has a volume management table T10 to maintain information about storage spaces to be accessed. For example, this volume management table T10 may be formed from the same data fields as those of the foregoing volume management table t1 of FIG. 4.

When adding a new path and a new virtual storage device, the business server control unit 11 sends a query to the storage virtualization server 20a to request information about a storage space corresponding to the new path to be added. Upon receipt of the requested information, the business server control unit 11 registers it in its volume management table T10. For example, when a need may arise to add a virtual storage device VSt1 for the purpose of data migration from the currently used storage device St1, the business server control unit 11 receives from the storage virtualization server 20a an identifier of a storage device relating to the path to be added. This identifier may be not of the virtual storage device (VSt1), but of the real storage device (St1). If this is the case, the business server control unit 11 incorporates the new path as a standby path of the existing multipath route MP1.

The virtual storage control unit 21 in the storage virtualization server 20a controls access to a virtual storage device from other servers including the business server SV1. The storage virtualization server 20a has its own volume management table T20 to maintain information about storage spaces of the virtual storage device. For example, this volume management table T20 may include at least the same data fields as those of the foregoing volume management table t2 of FIG. 7. More details of the volume management table T20 will be discussed later.

When a query about a storage space relating to a new path arrives from the business server SV1, the virtual storage control unit 21 responds to the query by retrieving relevant information from the volume management table T20. The virtual storage control unit 21 normally returns identifiers of a virtual storage device and a virtual volume associated with the new path. In the case of data migration, however, the virtual storage control unit 21 returns identifiers of a real storage device and a real volume. As will be described later, the virtual storage control unit 21 is configured to recognize data migration when there are two successive queries from the business server SV1 as to a storage space relating to a particular path. The virtual storage control unit 21 then informs the business server SV1 of a relevant real storage device identifier and real volume identifier(s).

Figure 12:
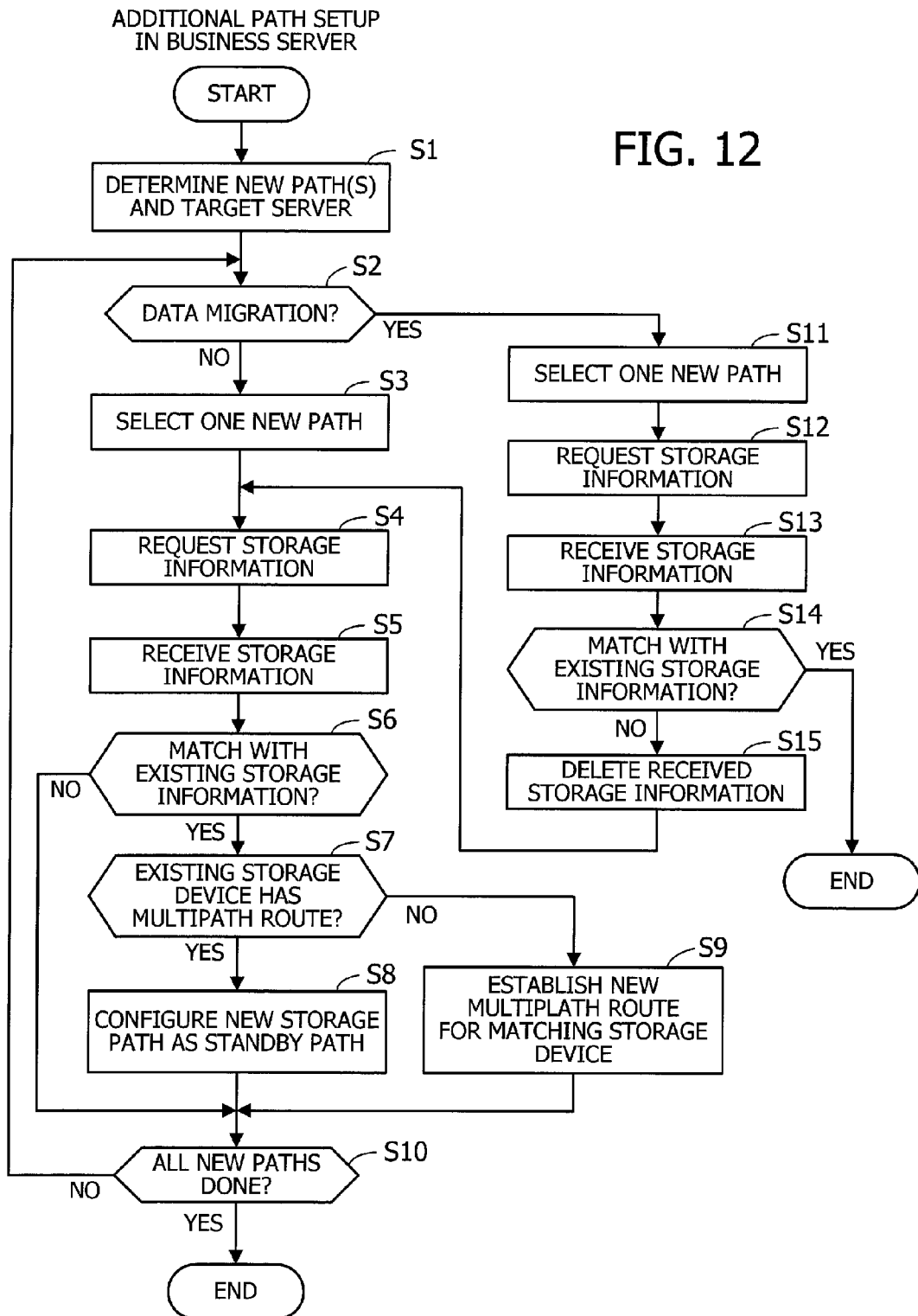
FIG. 12 is a flowchart illustrating how paths are added.

Referring now to the flowchart of FIG. 12, the next section describes how the business server SV1 adds new paths. The process described in this flowchart is not limited to the case of data migration, but may simply create additional paths and virtual volumes for other purposes.

(S1) The business server control unit 11 determines a new path(s) to be added and a target server for the path(s). Here the term "target server" refers to a virtualization server that is to be connected through the new path(s). The target server is designated by the LAN address of the virtualization server.

(S2) The business server control unit 11 determines whether to perform data migration from a real storage device to a virtual storage device. When no data migration is needed, the process advances to step S3. When data migration is planned, the process branches to step S11.

(S3) The business server control unit 11 selects one of the new paths that are added.

(S4) The business server control unit 11 sends a query to the storage virtualization server 20*a* to request storage information for the selected new path.

(S5) The business server control unit 11 receives storage information from the storage virtualization server 20*a* as a response to its query.

(S6) The business server control unit 11 compares the storage information received from the storage virtualization server 20*a* with the existing storage information registered in the volume management table T10. If a match is found, the process advances to step S7. If no match is found, the process skips to step S10.

(S7) The matching storage information in the volume management table T10 is of a specific existing storage device. The business server control unit 11 determines whether the existing storage device has a multipath route. If the storage device in question has a multipath route, the process advances to step S8. Otherwise, the process skips to step S9.

(S8) The business server control unit 11 configures the selected new path to the added virtual storage device as a standby path of the multipath route to which the existing storage device belongs.

(S9) The business server control unit 11 establishes a new multipath route for the matching storage device.

(S10) The business server control unit 11 determines whether all the new paths are done. If any pending new path is found, the process goes back to step S2. If all the new paths are done, the process terminates itself.

(S11) The business server control unit 11 selects one of the new paths that are added.

(S12) The business server control unit 11 sends a query to the storage virtualization server 20*a* to request storage information for the selected new path.

(S13) The business server control unit 11 receives storage information from the storage virtualization server 20*a* as a response to its query.

(S14) The business server control unit 11 compares the storage information received from the storage virtualization server 20*a* with the existing storage information registered in the volume management table T10. If no match is found, the process advances to step S15. If a match is found, the process terminates itself. Such a match is caused by, for example, an incorrect setup on the part of the storage virtualization server 20*a*.

(S15) The business server control unit 11 deletes the storage information received from the storage virtualization server 20*a* and proceeds to step S4. The deletion of storage information may not necessarily be executed immediately. For example, the storage information may be deleted a certain amount of time later.

This step S15 is followed by steps S4 to S6, which are similar to steps S12 to S14. This means that the business server control unit 11 sends the same query twice, first at step S12 and second at step S4, to request storage information for a new path, in the case where the new path is intended for data migration. These two successive queries permit the virtual storage control unit 21 in the storage virtualization server 20*a* to recognize that the business server SV1 intends to perform data migration.

Figure 13:
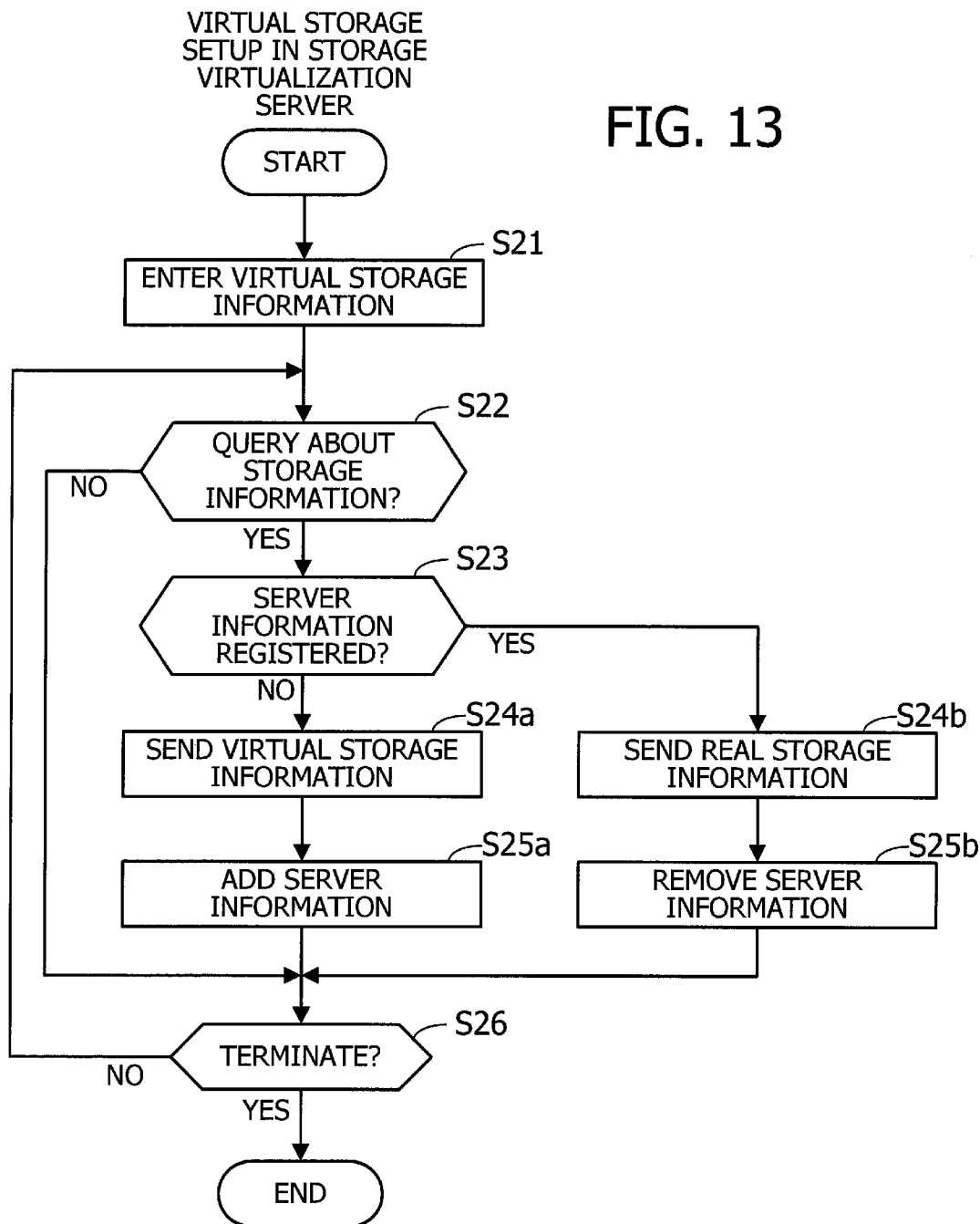
FIG. 13 is a flowchart illustrating how a storage device is virtualized.

Referring now to the flowchart of FIG. 13, the following section describes how the storage virtualization server 20*a* sets up a virtual storage device VSt1.

(S21) The virtual storage control unit 21 enters information about a virtual storage device VSt1 to the volume management table T20.

(S22) The virtual storage control unit 21 determines whether there is a query from the business server SV1 about storage information. This query, if present, is supposed to specify a particular path that the business server SV1 is handling. When there is such a query, the process advances to step S23. When no such queries are present, the process skips to step S26.

(S23) The virtual storage control unit 21 determines whether the identifier of the requesting server has already been registered in the volume management table T20. When the server identifier in question is not registered, the process advances to step S24*a*. When the server identifier is registered, the process proceeds to step S24*b*. Here the presence of a particular server identifier in the volume management table T20 means that the current processing is for the purpose of data migration.

(S24*a*) The virtual storage control unit 21 sends virtual storage information to the business server SV1. This virtual storage information refers to the storage information of a virtual storage device VSt1 associated with the specified path.

(S25*a*) The virtual storage control unit 21 enters the server identifier of the requesting business server SV1 into a relevant data field of the volume management table T20.

(S24*b*) The virtual storage control unit 21 transmits real storage information to the requesting business server SV1. This real storage information refers to the storage information of a storage device St1 associated with the specified path.

(S25*b*) The virtual storage control unit 21 removes the server identifier of the business server SV1 from the volume management table T20.

(S26) The virtual storage control unit 21 finishes its processing when the execution of the program is to be terminated. Otherwise, the virtual storage control unit 21 returns to step S22 to continue the processing.

The next section will provide a specific example of interactions between the business server SV1 and storage virtualization server 20*a*, together with consequent changes in the volume management table.

Figure 14:
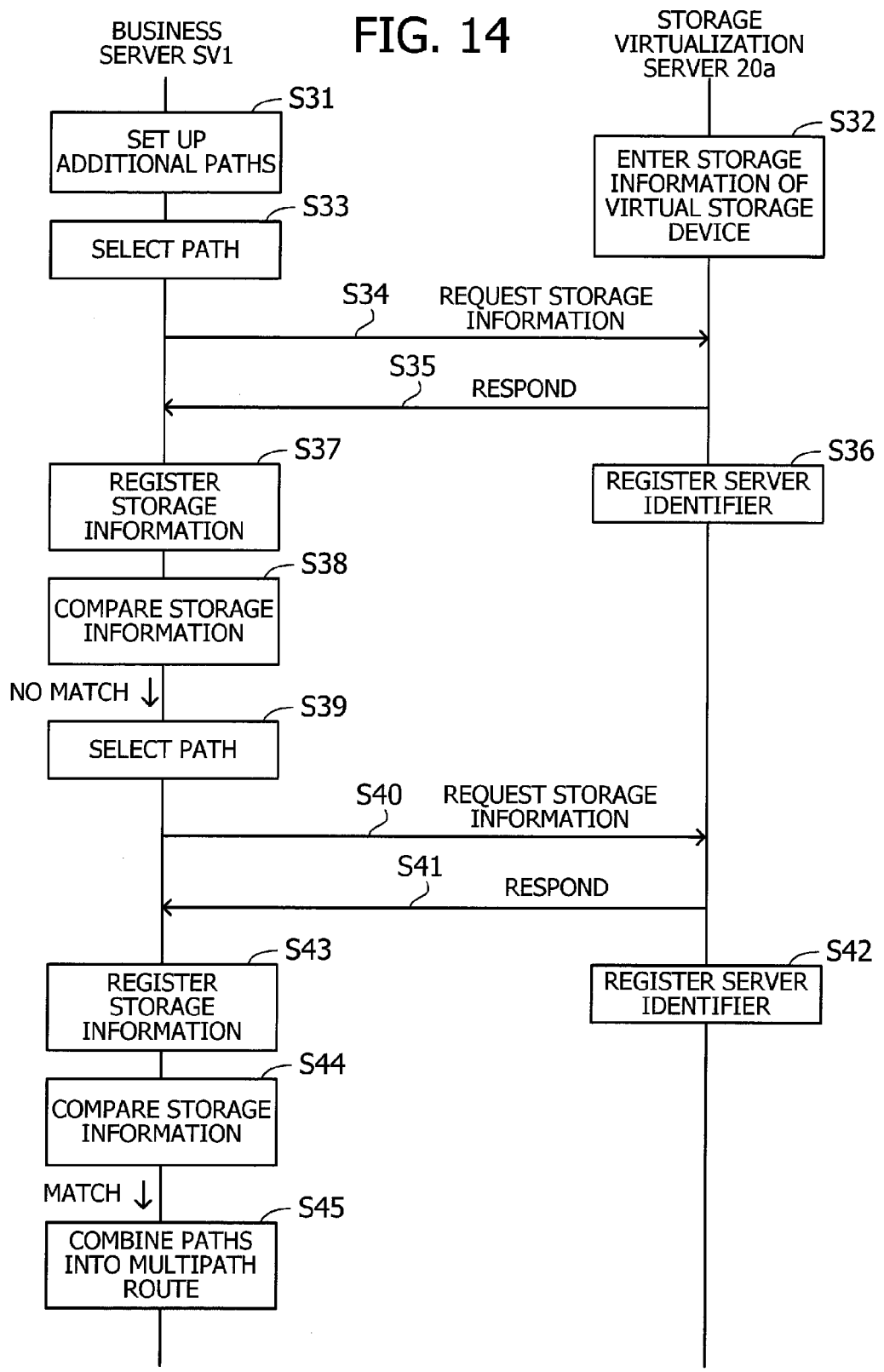
FIG. 14 illustrates an operation sequence when data migration is not performed.

FIG. 14 illustrates an operation sequence when data migration is not performed. This sequence represents the case in which the business server SV1 is simply adding access paths to use new virtual volumes. More specifically, the business server SV1 is now adding new paths P3 and P4 to make access to virtual volumes VVOL3 and VVOL4 (not illustrated) in a virtual storage device VSt3 (not illustrated). These virtual volumes VVOL3 and VVOL4 are mapped on real storage spaces in a storage device St3 (not illustrated).

In relation to the sequence diagram of FIG. 14 described below, FIGS. 15 and 16 illustrate how the volume management table is changed in the business server SV1. Further, FIG. 17 illustrates how the volume management table is changed in the storage virtualization server 20*a*.

(S31) In response to commands from the administrator, the business server control unit 11 sets up additional paths P3 and P4 for a storage virtualization server 20*a* newly incorporated into the network. Referring to the upper half of FIG. 15, the illustrated volume management table T10-1 represents what the volume management table T10 contains as a result of step S31. The topmost record of this volume management table T10-1 indicates the following things: (i) an existing multipath route MP1 is constituted by two paths P1 and P2, (ii) the paths P1 and P2 respectively lead to volumes VOL1 and VOL2 in a storage device St1, and (iii) the former path P1 is an active path while the latter path P2 is a standby path. These pieces of information were previously registered in the volume management table T10 before step S31 begins. Then at step S31, the business server SV1 produces another record including identifiers of new paths P3 and P4 as seen in FIG. 15.

(S32) Also in response to commands from the administrator, the virtual storage control unit 21 enters storage information describing the virtual storage device VSt3.

Figure 17:
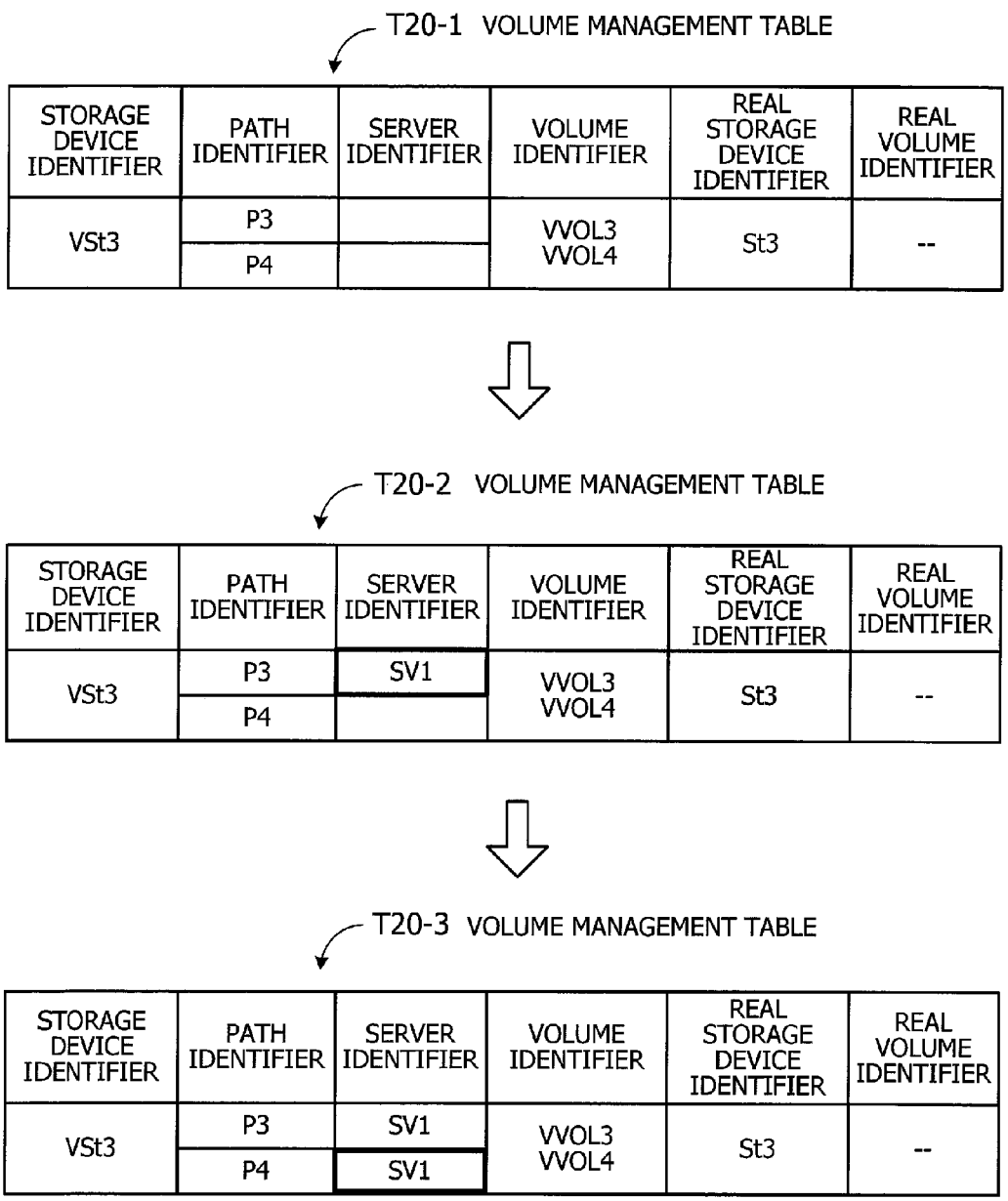
FIG. 17 illustrates how a volume management table is changed in the storage virtualization server.

Referring to the topmost part of FIG. 17, the illustrated volume management table T20-1 represents what the volume management table T20 contains as a result of step S32. Similar to the one discussed in FIG. 7, the volume management table T20 includes the data fields of storage device identifier, server identifier, volume identifier, real storage device identifier, and real volume identifier. In addition, the volume management table T20 has a data field for path identifiers. The path identifiers distinguish the paths used to reach different virtual volumes. Note that the server identifier field is divided into smaller cells to register server identifiers corresponding to individual path identifiers.

The volume management table T20-1 in FIG. 17 indicates the following things: (i) the virtual storage device VSt3 accommodates virtual volumes VVOL3 and VVOL4, (ii) the virtual volumes VVOL3 and VVOL4 can respectively be reached through paths P3 and P4, and (iii) their real storage space resides in a storage device St3. It is assumed, for exemplary purposes, that neither of the virtual volumes VVOL3 and VVOL4 is associated with a real volume.

(S33) The business server control unit 11 selects one of the paths newly added to the volume management table T10. Suppose now that path P3 is selected in the first place.

(S34) The business server control unit 11 sends a query to the storage virtualization server 20a via LAN to request storage information of the selected path P3. Specifically, this query notifies the storage virtualization server 20a of the identifier of path P3.

(S35) The virtual storage control unit 21 responds to the business server SV1 by sending the requested storage information of path P3 via LAN. At this step S35, the virtual storage control unit 21 executes the test described in step S23 of FIG. 13. As seen from the volume management table T20-1 in FIG. 17, the volume management table T20 contains no server identifiers for path P3 at the moment when the query is received. Therefore the virtual storage control unit 21 returns storage information of the virtual storage device VSt3. More specifically, the virtual storage control unit 21 returns a response that includes the following two combinations of identifiers: (i) storage device identifier "VSt3" and volume identifier "VVOL3," and (ii) storage device identifier "VSt3" and volume identifier "VVOL4."

(S36) Subsequent to the response including storage information of the virtual storage device VSt3, the virtual storage control unit 21 enters the identifier "SV1" of the business server SV1 into a relevant data filed associated with path P3. Referring to the middle part of FIG. 17, the illustrated volume management table T20-2 indicates what the volume management table T20 contains as a result of step S36. Specifically, a server identifier "SV1" representing the business server SV1 is newly registered for path P3.

(S37) The business server control unit 11 updates its own volume management table T10 with the received storage information. Referring to the lower half of FIG. 15, the illustrated volume management table T10-2 represents what the volume management table T10 contains as a result of step S37. This volume management table T10-2 reflects the fact that a virtual storage device VSt3 accommodating virtual volumes VVOL3 and VVOL4 is connected to the business server SV1 via path P3.

(S38) The business server control unit 11 compares the storage information received from the storage virtualization server 20a with the existing storage information. This operation is similar to step S6 of FIG. 12. In the present context, the received storage information is (VSt3, VVOL3) and (VSt3, VVOL4), neither of which matches with the existing storage information (St1, VOL1) or (St1, VOL2). Accordingly, the business server control unit 11 turns to the next new path.

(S39) The business server control unit 11 selects one of the paths newly added to the volume management table T10. In the present context, the remaining path P4 is selected.

(S40) The business server control unit 11 sends a query to the storage virtualization server 20a via LAN to request storage information of the selected path P4. Specifically, this query notifies the storage virtualization server 20a of the identifier of path P4.

(S41) The virtual storage control unit 21 responds to the business server SV1 by sending the requested storage information of path P4. As seen from the volume management table T20-2 in FIG. 17, the volume management table T20 contains no server identifiers for path P4 at the moment. Therefore the virtual storage control unit 21 returns storage information of the virtual storage device VSt3. More specifically, the virtual storage control unit 21 returns a response that includes the following two combinations of identifiers: (i) storage device identifier "VSt3" and volume identifier "VVOL3," and (ii) storage device identifier "VSt3" and volume identifier "VVOL4."

(S42) Subsequent to the response including storage information of the virtual storage device VSt3, the virtual storage control unit 21 enters the identifier "SV1" of the business server SV1 into a relevant data filed associated with path P4. Referring to the bottom part of FIG. 17, the illustrated volume management table T20-3 indicates what the volume management table T20 contains as a result of step S42. Specifically, a server identifier "SV1" representing the business server SV1 is registered for path P4.

(S43) The business server control unit 11 updates its own volume management table T10 with the received storage information. Referring to the upper half of FIG. 16, the illustrated volume management table T10-3 represents what the volume management table T10 contains as a result of step S43. This volume management table T10 -3 reflects the fact that a virtual storage device VSt3 accommodating virtual volumes VVOL3 and VVOL4 is connected to the business server SV1 via path P4.

(S44) The business server control unit 11 compares the storage information received from the storage virtualization server 20a with the existing storage information. As seen in FIG. 16, the received storage information (VSt3, VVOL3) and (VSt3, VVOL4) of path P4 matches with the existing storage information (VSt3, VVOL3) and (VSt3, VVOL4) registered at step S37 for path P3.

(S45) Because the storage information of path P3 matches with that of path P4, the business server control unit 11 combines these paths P3 and P4 into a multipath route. Referring to the lower half of FIG. 16, the illustrated volume management table T10-4 represents what the volume management table T10 contains as a result of step S45. This volume management table T10-4 indicates that a new multipath route MP2 has been produced from paths P3 and P4. The business server control unit 11 selects one path as an active path and the other as a standby path. In the exemplary volume management table T10-4 of FIG. 16, path P3 serves as the active path, and path P4 as the standby path.

The above-described process enables the business server SV1 to make access to virtual volumes VVOL3 and VVOL4 in the virtual storage device VSt3 via a newly added multipath route MP2.

Figure 18:
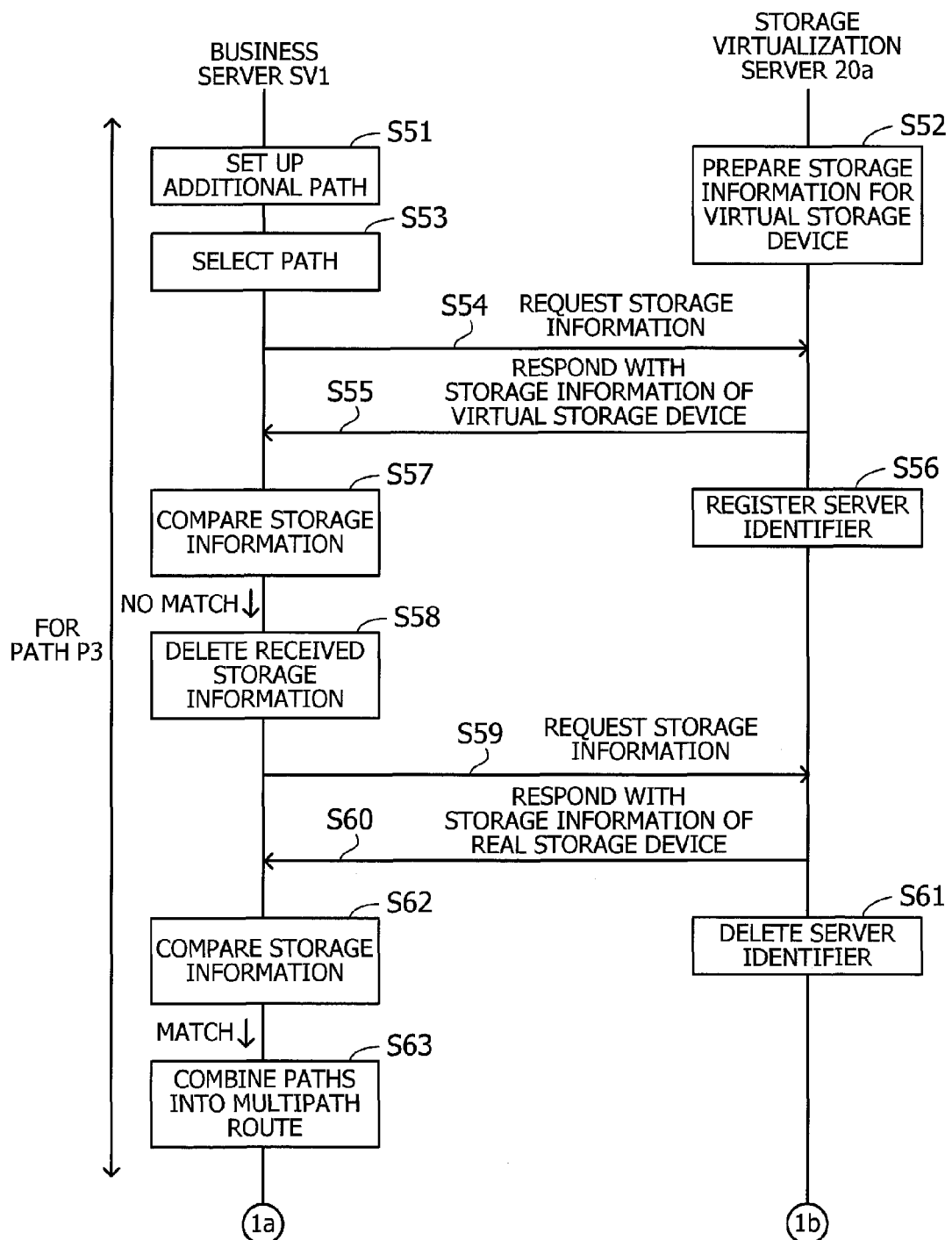
FIGS. 18 and 19 illustrate an operation sequence when data migration is performed.
Figure 19:
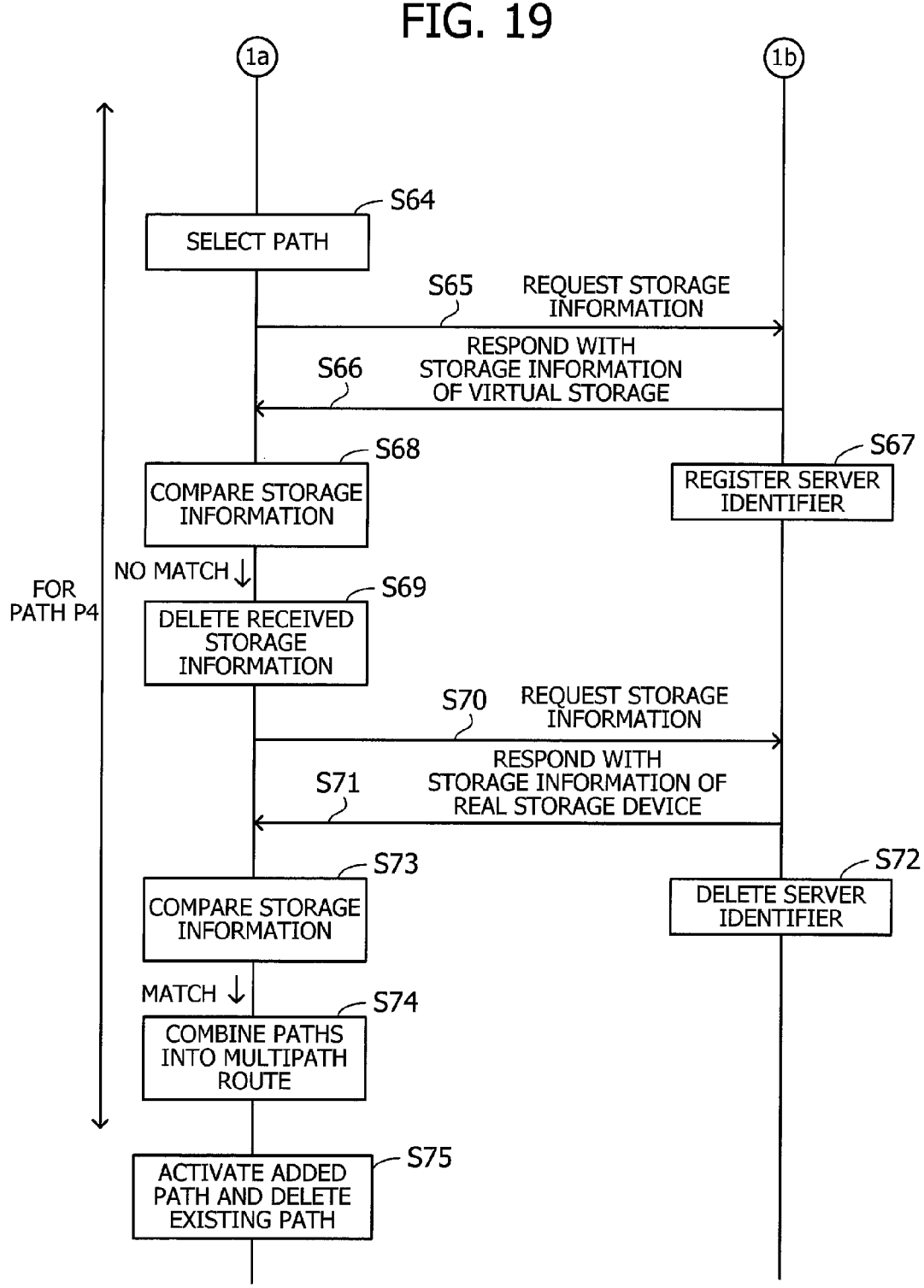
Figure 22:
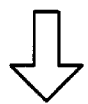

The next section will provide a specific example of interactions between the business server SV1 and storage virtualization server 20a, together with consequent changes in the volume management table, in the context of data migration. FIGS. 18 and 19 illustrate an operation sequence when data migration is performed. FIGS. 20 to 22 illustrate how the volume management table is changed in the business server SV1. Further, FIG. 23 illustrates how the volume management table is changed in the storage virtualization server 20a.

(S51) In response to commands from the administrator, the business server control unit 11 sets up additional paths P3 and P4 for a storage virtualization server 20a newly incorporated into the network. Referring to the upper half of FIG. 20, the illustrated volume management table T10-11 represents what the volume management table T10 contains as a result of step S51. This volume management table T10-11 indicates the following things: (i) an existing multipath route MP1 is constituted by two paths P1 and P2, (ii) the paths P1 and P2 respectively lead to volumes VOL1 and VOL2 in a storage device St1, and (iii) the former path P1 is an active path while the latter path P2 is a standby path. These pieces of information were previously registered in the volume management table T10 before step S51 begins. Then at step S51, the business server SV1 produces another record including identifiers of new paths P3 and P4 as seen in FIG. 20.

(S52) Also in response to commands from the administrator, the virtual storage control unit 21 enters storage information describing a virtual storage device VSt1. Referring to the middle part of FIG. 23, the illustrated volume management table T20-11 represents what the volume management table T20 contains as a result of step S52. The volume management table T20-1 in FIG. 17 indicates the following things: (i) the virtual storage device VSt1 accommodates virtual volumes VVOL1 and VVOL2, (ii) the two virtual volumes VVOL1 and VVOL2 can respectively be reached through paths P3 and P4, (iii) their real storage space resides in a storage device St1, and (iv) virtual volumes VVOL1 and VVOL2 are associated respectively with real volumes VOL1 and VOL2.

(S53) The business server control unit 11 selects one of the paths newly added to the volume management table T10. Suppose now that path P3 is selected in the first place.

(S54) The business server control unit 11 sends a query to the storage virtualization server 20a via LAN to request storage information of the selected path P3. Specifically, this query notifies the storage virtualization server 20a of the identifier of path P3.

(S55) The virtual storage control unit 21 responds to the business server SV1 by sending the requested storage information of path P3 via LAN. At this step S55, the virtual storage control unit 21 executes the test described in step S23 of FIG. 13. As seen from the volume management table T20-11 in FIG. 23, the volume management table T20 contains no server identifiers for path P3 at the moment when the query is received. Therefore the virtual storage control unit 21 returns storage information of the virtual storage device VSt1. More specifically, the virtual storage control unit 21 returns a response that includes the following two combinations of identifiers: (i) storage device identifier "VSt1" and volume identifier "VVOL1," and (ii) storage device identifier "VSt1" and volume identifier "VVOL2."

(S56) Subsequent to the response including storage information of the virtual storage device VSt1, the virtual storage control unit 21 enters the identifier "SV1" of the business server SV1 into a relevant data filed associated with path P3. Referring to the upper part of FIG. 23, the illustrated volume management table T20-12 represents what the volume management table T20 contains as a result of step S56. This volume management table T20-12 contains a server identifier "SV1" newly registered for path P3.

(S57) The business server control unit 11 receives storage information from the storage virtualization server 20a and compares it with the existing storage information. This operation is similar to step S14 of FIG. 12. In the present context, the received storage information contains (VSt1, VVOL1) and (VSt1, VVOL2), neither of which matches with the existing storage information (St1, VOL1) or (St1, VOL2).

(S58) Because data migration is intended, and because step S57 has ended up with no matches, the business server control unit 11 deletes the storage information received from the storage virtualization server 20a immediately or a certain amount of time later. Accordingly, the volume management table T10 keeps its previous state, i.e., as in the volume management table T10-11 of FIG. 20.

(S59) The business server control unit 11 sends a query again to the storage virtualization server 20a via LAN to request storage information of the selected path P3.

(S60) The virtual storage control unit 21 responds to the business server SV1 by sending the requested storage information of path P3. As seen from the volume management table T20-12 in FIG. 23, the volume management table T20 now contains a server identifier "SV1" for path P3. The virtual storage control unit 21 thus returns storage information of a relevant real storage device. More specifically, the virtual storage control unit 21 returns a response that includes the following two combinations of identifiers: (i) storage device identifier "St1" and volume identifier "VOL1," and (ii) storage device identifier "St1" and volume identifier "VOL2."

(S61) Subsequent to the response including storage information of the real storage device, the virtual storage control unit 21 deletes the identifier "SV1" of the business server SV1 from its relevant data filed associated with path P3 in the volume management table T20. This means that the volume management table T20 returns to its previous state seen in the volume management table T20-11 of FIG. 23.

(S62) The business server control unit 11 compares the storage information received from the storage virtualization server 20a with the existing storage information. This operation is similar to step S6 of FIG. 12. In the present context, the received storage information (St1, VOL1) and (St1, VOL2) of path P3 matches with the existing storage information (St1, VOL1) and (St1, VOL2) of the existing paths P1 and P2.

(S63) This step corresponds to steps S7 and S8 of FIG. 12. That is, the business server control unit 11 determines that the existing paths P1 and P2 matching with path P3 constitute a multipath configuration (i.e., they are included in the existing multipath route MP1), as it does at step S7. The business server control unit 11 thus configures the new path P3 as a standby path of the multipath route MP1. Referring to the lower half of FIG. 20, the illustrated volume management table T10-12 represents what the volume management table T10 contains as a result of step S63. This volume management table T10-12 indicates that three paths P1 to P3 constitute a multipath route MP1, where the path P3 is a standby path.

(S64) The business server control unit 11 selects one of the paths newly added to the volume management table T10. In the present context, the remaining path P4 is selected.

(S65) The business server control unit 11 sends a query to the storage virtualization server 20a via LAN to request storage information of the selected path P4. Specifically, this query notifies the storage virtualization server 20a of the identifier of path P4.

(S66) The virtual storage control unit 21 responds to the business server SV1 by sending the requested storage information of path P4. As seen from the volume management table T20-11 in FIG. 23, the volume management table T20 contains no server identifiers for path P4 at the moment. Therefore the virtual storage control unit 21 returns storage information of the virtual storage device VSt1. More specifically, the virtual storage control unit 21 returns a response that includes the following two combinations of identifiers: (i) storage device identifier "VSt1" and volume identifier "VVOL1," and (ii) storage device identifier "VSt1" and volume identifier "VVOL2."

(S67) Subsequent to the response including storage information of the virtual storage device VSt1, the virtual storage control unit 21 enters the identifier "SV1" of the business server SV1 into a relevant data filed associated with path P4. Referring to the bottom part of FIG. 23, the illustrated volume management table T20-13 represents what the volume management table T20 contains as a result of step S67. As seen, a server identifier "SV1" representing the business server SV1 is newly registered for path P4.

(S68) The business server control unit 11 receives storage information from the storage virtualization server 20a and compares it with the existing storage information. In the present context, the received storage information contains (VSt1, VVOL1) and (VSt1, VVOL2), neither of which matches with the existing storage information (St1, VOL1) or (St1, VOL2).

(S69) Because data migration is intended, and because step S68 has ended up with no matches, the business server control unit 11 deletes the storage information received from the storage virtualization server 20a. This means that the volume management table T10 keeps its previous state seen in the volume management table T10-12 of FIG. 20.

(S70) The business server control unit 11 sends a query again to the storage virtualization server 20a via LAN to request storage information of path P4.

(S71) The virtual storage control unit 21 responds to the business server SV1 by sending the requested storage information of path P4. As seen from the volume management table T20-13 in FIG. 23, the volume management table T20 now contains a server identifier "SV1" for path P4. The virtual storage control unit 21 thus returns storage information of a relevant real storage device. More specifically, the virtual storage control unit 21 returns a response that includes the following two combinations of identifiers: (i) storage device identifier "St1" and volume identifier "VOL1," and (ii) storage device identifier "St1" and volume identifier "VOL2."

(S72) Subsequent to the response including storage information of the real storage device, the virtual storage control unit 21 deletes the identifier "SV1" of the business server SV1 from its relevant data filed associated with path P4 in the volume management table T20. This means that the volume management table T20 returns to its previous state seen in the volume management table T20-11 of FIG. 23.

(S73) The business server control unit 11 compares the storage information received from the storage virtualization server 20a with the existing storage information. In the present context, the received storage information (St1, VOL1) and (St1, VOL2) of path P4 matches with the existing storage information (St1, VOL1) and (St1, VOL2) of the existing paths P1 to P3.

(S74) The business server control unit 11 determines that the existing paths P1 to P3 matching with path P4 constitute a multipath configuration (i.e., they are included in the existing multipath route MP1). The business server control unit 11 thus configures the new path P4 as a standby path of the multipath route MP1. Referring to the upper half of FIG. 21, the illustrated volume management table T10-13 represents what the volume management table T10 contains as a result of step S74. This volume management table T10-13 indicates that four paths P1 to P4 constitute a multipath route MP1, where the path P4 is a standby path.

The above processing up to step S74 enables the business server SV1 to use additional paths P3 and P4 for access to a storage device St1. Although the business server SV1 recognizes it as a storage device St1, what is actually reached by using these paths P3 and P4 is a virtual storage device VSt1 that is accessible through the storage virtualization server 20a.

As noted above, new paths P3 and P4 are added as standby paths of the existing multipath route MP1, despite the fact that they are intended for access to a virtual storage device VSt1, i.e., a virtualized version of the existing storage device St1. The business server SV1 never uses these paths P3 and P4 to make access to the existing storage device St1 during the process of adding them as new paths. The business server SV1 is therefore capable of adding such paths while continuing access to the existing storage device St1.

(S75) The business server control unit 11 reconfigures both the existing paths P1 and P2 as standby paths and selects one of the new paths P3 and P4 as an active path. Referring to the lower half of FIG. 21, the illustrated volume management table T10-14 gives an example of what the volume management table T10 contains at this moment. That is, path P3 has been changed from standby path to active path.

Afterwards, the business server control unit 11 removes standby paths P1 and P2. Referring to FIG. 22, the illustrated volume management table T10-15 represents what the volume management table T10 contains at this moment. That is, the cells for the paths P1 and P2 are blanked out. The storage system now begins to operate with the paths P3 and P4 added as part of a virtual environment, in which the business server control unit 11 makes access to virtual volumes VVOL1 and VVOL2 via the active path P3.

The business server control unit 11 could experience access errors when changing the selection of active path to a newly added path. It is, therefore, preferable to temporarily deactivate the multipath route MP1 during the change. In other words, access to the existing storage device St1 and the added virtual storage device VSt1 is interrupted, not during the entire process of virtualizing the existing storage device St1, but only at the moment of step S75 when the active path is switched. The procedure discussed above in FIGS. 18 and 19 thus reduces the amount of time during which the business server SV1 is unable to make access to storage devices.

The next section describes how the storage virtualization server 20a performs data migration. As described above, the process of data migration involves virtualization of the destination storage device, so that the system can migrate data in parallel with its regular operations. In this process of data migration under a virtual environment, the virtualization server copies data at appropriate times, while allowing the business server to continue access to storage devices in its usual way. When the copy is finished, the virtualization server changes the setup of real storage space to finalize the migration. The migration process does not interrupt access from the business server to virtual storage devices.

Figure 24:
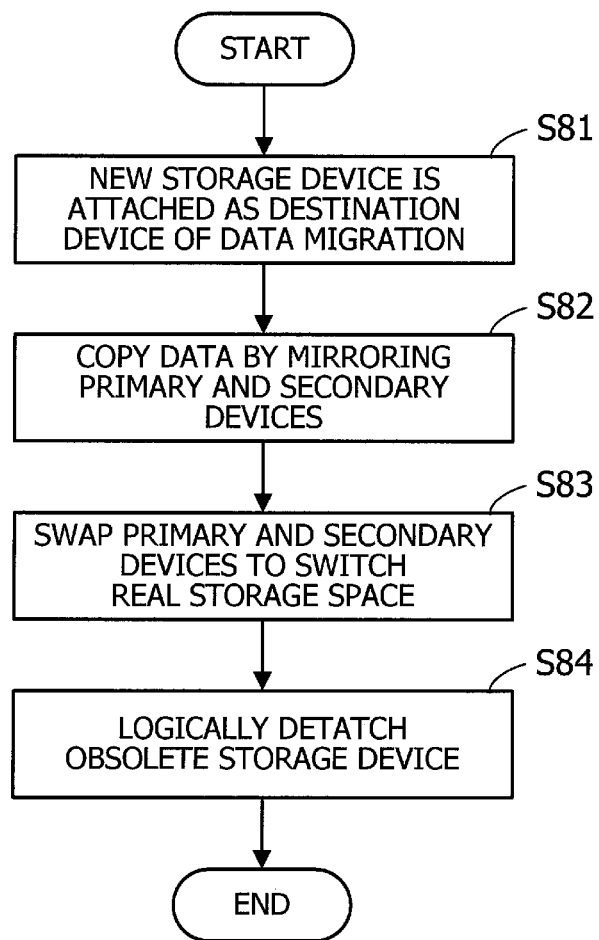
FIG. 24 is a flowchart of a data migration process.

FIG. 24 is a flowchart of a data migration process.

(S81) A new storage device St2 is attached to the storage virtualization server 20a for use as the destination device of data migration.

(S82) The virtual storage control unit 21 sets up mirroring functions for copying data from an existing storage device St1 (current storage device) to the new storage device St2. In this mirroring setup, the current storage device St1 is referred to as the primary device (or source device), while the new storage device St2 is referred to as the secondary device (or destination device).

(S83) Upon completion of the data copying, the virtual storage control unit 21 swaps the primary device and secondary device. The virtual storage control unit 21 also switches the assignment of real storage space for the virtual storage device VSt1, from the current storage device St1 to the destination storage device St2. More specifically, the volume management table T20 has been in the state seen in the volume management table T20-11 of FIG. 23. The virtual storage control unit 21 now changes the real storage device identifier from "St1" to "St2."

(S84) Subsequent to the swapping of primary and secondary devices, the virtual storage control unit 21 logically detaches the current storage device St1, which is now obsolete.

Figure 25:
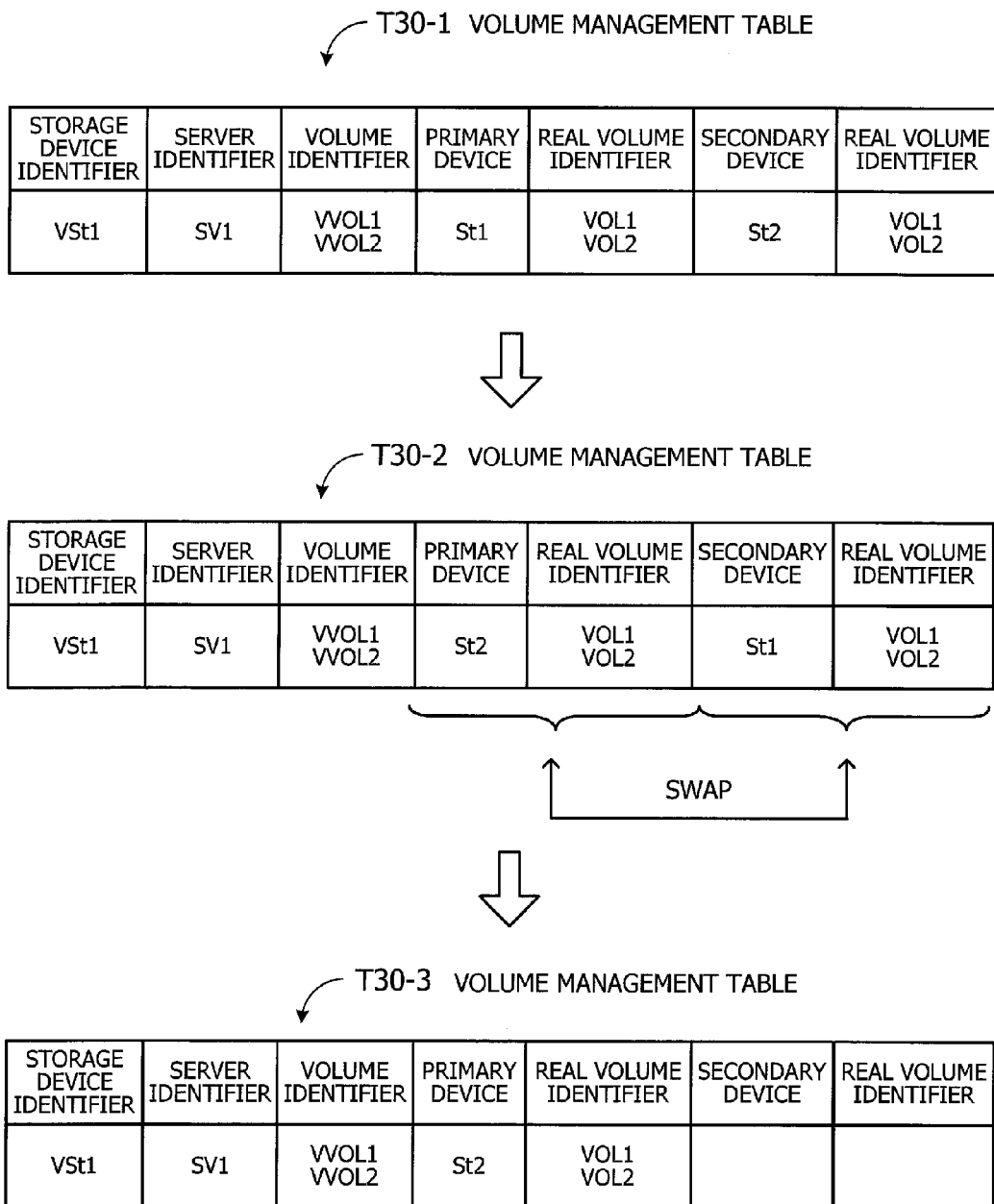
FIG. 25 illustrates how a volume management table is changed in the business server during the course of data migration.

FIG. 25 illustrates how a volume management table is changed in the business server SV1 during the course of data migration. The illustrated volume management table T30 is stored in, for example, RAM of the business server SV1. FIG. 25 actually includes three volume management tables T30-1 to T30-3, each representing a different state of the volume management table T30.

The volume management table T30 is formed from the following data fields: "Storage Device Identifier," "Server Identifier," "Volume Identifier," "Primary Device," "Real Volume Identifier," "Secondary Device," and "Real Volume Identifier."

The storage device identifier field contains an identifier that designates a source virtual storage device whose data is to be migrated to another device. The server identifier field contains an identifier that indicates which server is using the source virtual storage device. The volume identifier field contains identifiers that designate source virtual volumes to be migrated.

The primary device field contains an identifier that indicates which real storage device acts as the primary device in the mirroring operation. The real volume identifier field next to the primary device field contains identifiers that indicate real source volumes in the primary device, which correspond to the source virtual volume mentioned above.

The secondary device field contains an identifier that indicates which real storage device acts as the secondary device in the mirroring operation. The real volume identifier field next to the secondary device field contains identifiers that indicate the real destination volumes in the secondary device, which are associated with the source virtual volume mentioned above.

Referring to the upper part of FIG. 25, the illustrated volume management table T30-1 represents what the volume management table T30 contains when the data mirroring begins at step S82 of FIG. 24. As seen in this volume management table T30-1, the real source storage device St1 is registered as a primary device, and the real destination storage device St2 is registered as a secondary device.

Referring to the middle part of FIG. 25, the illustrated volume management table T30-2 represents what the volume management table T30 contains when the primary and secondary devices are swapped at step S83 of FIG. 24. As seen in this volume management table T30-2, the real source storage device St1 has been changed from primary device to secondary device, and the real destination storage device St2 has been changed from secondary device to primary device.

Referring to the bottom part of FIG. 25, the illustrated volume management table T30-3 represents what the volume management table T30 contains when the current storage device is logically detached from the system at step S84 of FIG. 24. The secondary identifier and its associated real volume identifiers have been removed from this volume management table T30-3, thus indicating that the secondary storage device St1 no longer has its logical connection.

Figure 26:
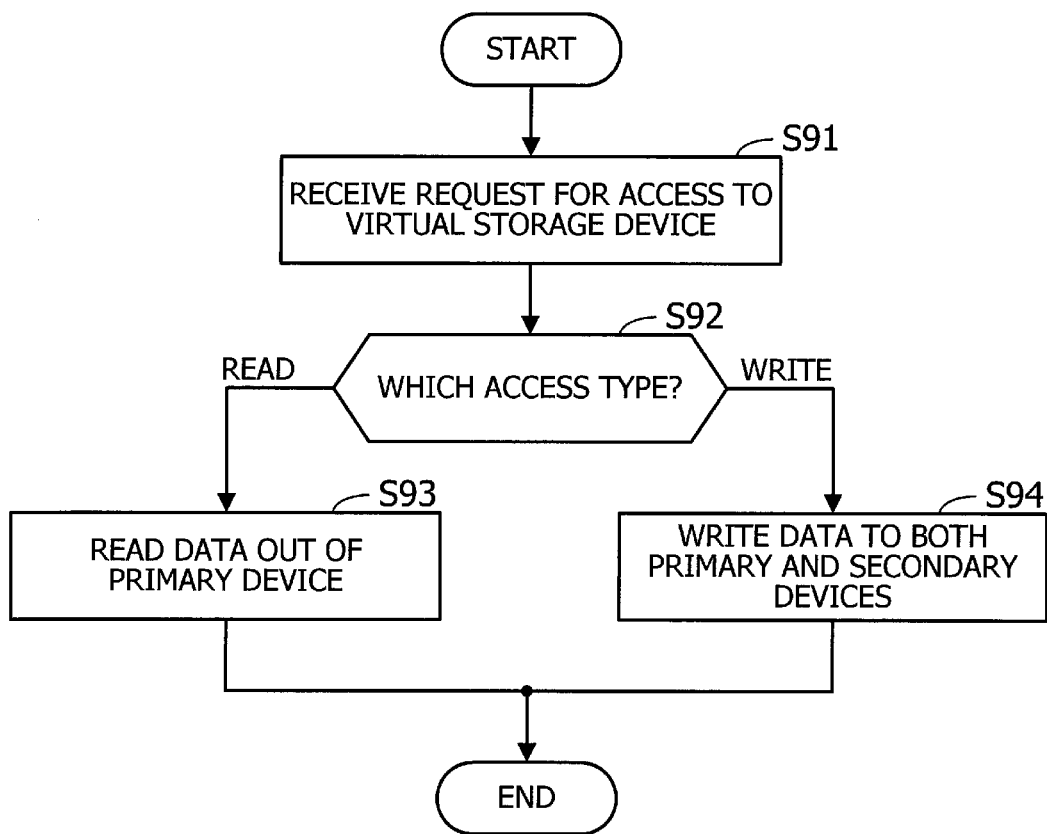
FIG. 26 is a flowchart illustrating an exemplary process of controlling access to a virtual storage device during data migration.

The business server SV1 is allowed to continue its access to the virtual storage device VSt1 even during the foregoing steps S81 and S82 of FIG. 24. FIG. 26 is a flowchart illustrating an exemplary process of controlling access to a virtual storage device during data migration.

(S91) The virtual storage control unit 21 receives a request from the business server SV1 for access to the virtual storage device VSt1.

(S92) The virtual storage control unit 21 determines the type of the requested access. When it is a read request, the process advances to step S93. When it is a write request, the process proceeds to step S94.

(S93) The virtual storage control unit 21 reads the requested data out of the primary real storage device St1 and delivers it to the requesting business server SV1.

(S94) The real storage device St1 is currently serving as the primary device. The virtual storage control unit 21 writes the specified write data to both the primary real storage device St1 and secondary real storage device St2. This write operation ensures the data consistency between the primary device and secondary device, whether the specified write address has already been migrated or is to be migrated later.

The data migration may use some other method to avoid interruption to data access to the virtual storage device VSt1. For example, the virtual storage control unit 21 may be configured to have mapping data in RAM to store all destination addresses of the virtual storage device VSt1 and their associated flags indicating whether the data has been migrated. Each time the data migration of an address is finished, the virtual storage control unit 21 records it by changing a mapping data flag relevant to the address.

With the above method, the virtual storage control unit 21 also handles write and read requests from the business server SV1 during data migration. In the case of a data write request, the business server SV1 writes data to its specified address in the secondary device and changes a relevant mapping data flag to indicate that the data migration has been done for that address. In the case of a data read request, the virtual storage control unit 21 first tests the status of a mapping data flag of the specified read address. If the flag indicates that data migration is not finished, the business server SV1 reads data out of the primary device. If the flag indicates that data migration is finished, the business server SV1 reads data out of the secondary device. These operations maintain the consistency of data between the primary and secondary devices.

The virtual environment described above permits the virtualization server to handle access requests from the business server in a centralized manner. The virtualization server thus performs data migration as a background process in parallel with the tasks of controlling access requests, without the need for modifying procedures of the business server or imposing an increased load on the business server.

Figure 27:
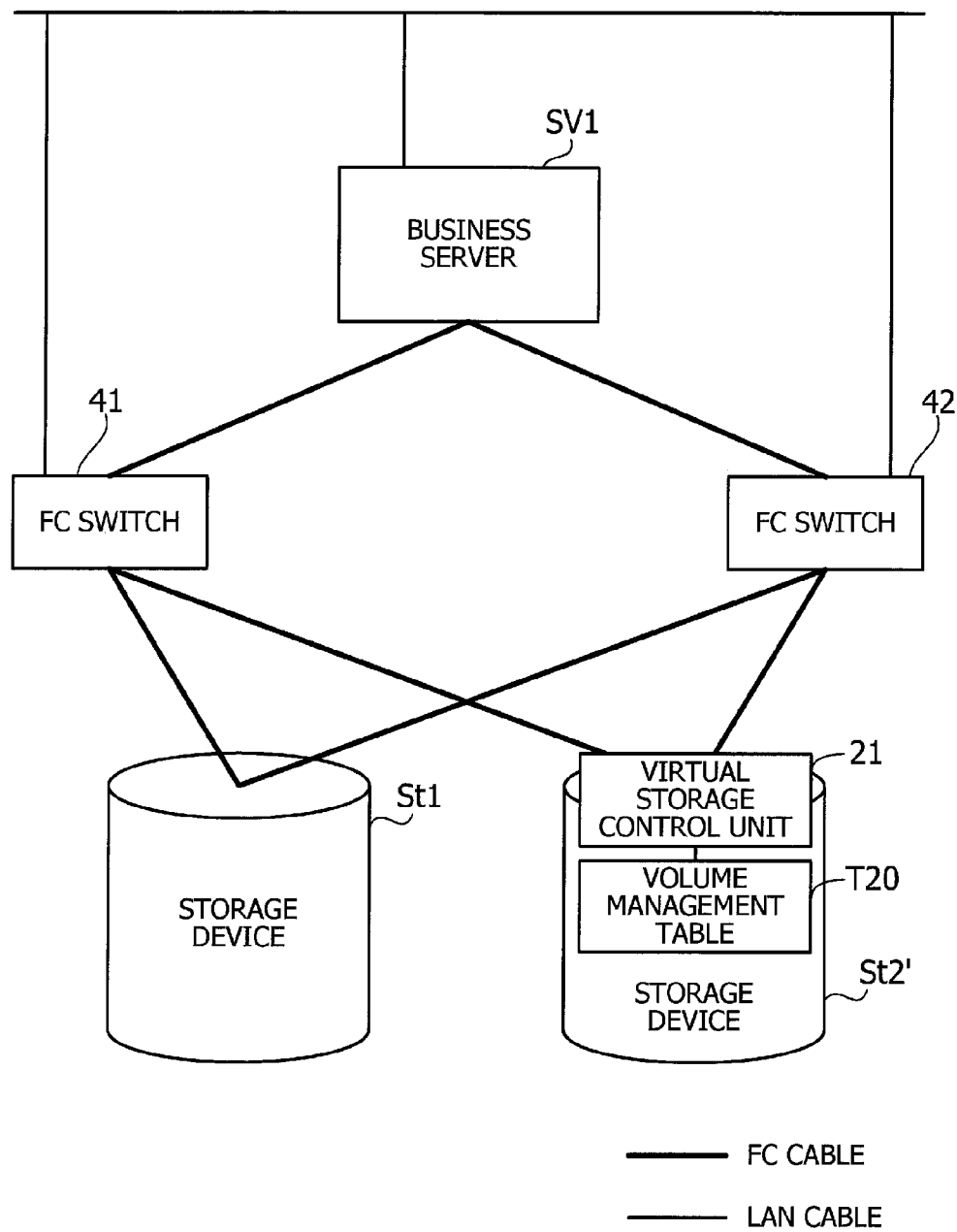
FIG. 27 illustrates an exemplary configuration of a storage system according to a variation of the second embodiment.

Lastly, a variation of the above second embodiment is discussed below. FIG. 27 illustrates an exemplary configuration of a storage system according to a variation of the second embodiment. The devices and components seen in FIG. 27 have basically the same reference numerals or symbols as those of their counterparts in FIG. 11.

The illustrated storage system 1b of FIG. 27 is different from the second embodiment in that the functions of the foregoing storage virtualization server 20a are integrated into a storage device St2. That is, the illustrated storage device St2' in FIG. 27 includes a virtual storage control unit 21 and a volume management table T20, besides providing a destination storage space for data migration. These components work similarly to their counterparts discussed in FIG. 11. For example, the storage device St2' includes a controller configured to control access to the destination storage space of data migration. The controller includes a processor, RAM, non-volatile memory, and other circuits. The processor executes a program to provide processing functions of the virtual storage control unit 21. The RAM provides a storage space for the volume management table T20. The storage system 1b is configured in this way to achieve the storage virtualization and data migration similarly to the second embodiment.

The above embodiments have proposed an information processing apparatus, virtualization control apparatus, business server, and virtualization server. The processing functions of each such apparatus may be implemented on a computer system. That is, the processing steps of each apparatus are encoded in a computer program, and a computer system executes such programs to provide the proposed processing functions. The programs may be stored in a computer-readable storage medium.

Such computer-readable storage media include magnetic storage devices, optical discs, magneto-optical storage media, semiconductor memory devices, and other tangible storage media. Magnetic storage devices include hard disk drives (HDD), flexible disks (FD), and magnetic tapes, for example. Optical disc media include DVD, DVD-RAM, CD-ROM, CD-R, CD-RW, and others. Magneto-optical storage media include magneto-optical discs (MO), for example. Computer-readable storage media for computer programs do not include transitory media such as propagating signals.

Portable storage media, such as DVD and CD-ROM, may be used for distribution of program products. Network-based distribution of software programs may also be possible, in which case several master program files are made available on a server computer for downloading to other computers via a network.

For example, a computer stores various software components in its local storage device, which have previously been installed from a portable storage medium or downloaded from a server computer. The computer executes programs read out of the local storage device, thereby performing the programmed functions. Where appropriate, the computer may execute program codes read out of a portable storage medium, without installing them in its local storage device. Another alternative method is that the computer dynamically downloads programs from a server computer when they are demanded and executes them upon delivery.

It is further noted that the above processing functions may be executed wholly or partly by a DSP, ASIC, PLD, or other electronic circuits.

The embodiments discussed above propose a storage system, a virtualization control apparatus, an information processing apparatus, and a method for controlling a storage system. According to an aspect of these embodiments, the proposed techniques reduce the amount of time during which a storage device is temporarily inaccessible in the process of virtualization, thus making it possible to perform data migration without interrupting the server services.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage system comprising:
an information processing apparatus configured to make access to a first storage device via a first path; and
a virtualization control apparatus configured to control access to a second storage device via a second path, the second storage device being provided by virtualizing the first storage device,
wherein the virtualization control apparatus includes a first control unit configured to send an identifier of the first storage device to the information processing apparatus in response to a query from the information processing apparatus which requests information about a storage space that is accessible via the second path, and
wherein the information processing apparatus includes a second control unit configured to incorporate the second path as an inactive standby path when the identifier received as a response to the query matches with an identifier of the first storage device accessible via the first path,
the second control unit sends the query twice, as first and second queries, to the virtualization control apparatus,
the second control unit incorporates the second path as an inactive standby path when the identifier received as a response to the second query matches with the identifier of the first storage device accessible via the first path,
the first control unit is configured to send an identifier of the second storage device in response to the first query and send the identifier of the first storage device in response to the second query; and
the first control unit recognizes data migration when there are two queries from the second control unit as to the storage space relating to a same path and the first control unit informs the second control unit of the identifier of the first storage device which is a real storage device identifier.

2. The storage system according to claim 1, wherein:
the second control unit is configured to change the first path to an inactive standby path after incorporating the second path as an inactive standby path, and change the second path to an active state to permit access to the second storage device via the second path; and
the first control unit is configured to execute data migration from the first storage device to a destination storage device, while allowing the second control unit to continue controlling access to the second storage device.

3. The storage system according to claim 2, wherein the first control unit is configured to change assignment of a real storage space for the second storage device from the first storage device to the destination storage device, upon completion of the data migration.

4. A virtualization control apparatus controlling access to a second storage device via a first path, the second storage device being provided by virtualizing a first storage device, the virtualization control apparatus comprising:
a receiving unit configured to receive a query from an information processing apparatus which requests information about a storage space that is accessible via the first path, the information processing apparatus being capable of making access to the first storage device via a second path; and
a sending unit configured to send an identifier of the first storage device to the information processing apparatus in response to the query received from the information processing apparatus, the identifier causing the information processing apparatus to recognize that the storage space accessible via the first path resides in the first storage device and thus incorporate the first path as an inactive standby path, wherein
the receiving unit receives the query twice, as first and second queries, from the virtualization control apparatus;
the sending unit is configured to send an identifier of the second storage device in response to the first query received by the receiving unit, and send the identifier of the first storage device in response to the second query received by the receiving unit; and
the receiving unit recognizes data migration when there are two queries from the information processing apparatus as to the storage space relating to a same path and the sending unit informs the information processing apparatus of the identifier of the first storage device which is a real storage device identifier.

5. The virtualization control apparatus according to claim 4, further comprising a migration control unit configured to execute data migration from the first storage device to a destination storage device while continuing control of access from the information processing apparatus to the second storage device via the first path.

6. The virtualization control apparatus according to claim 5, wherein the migration control unit is configured to change assignment of a real storage space for the second storage device from the first storage device to the destination storage device, upon completion of the data migration.

7. An information processing apparatus which makes access to a first storage device via a first path, the information processing apparatus comprising:
a commanding unit configured to request a virtualization control apparatus to send an identifier of a real storage device assigned to a second storage device as information about a storage space that is accessible via a second path, the second storage device being provided by virtualizing a first storage device and accessible via the second path under control of the virtualization control apparatus; and
a setting unit configured to incorporate the second path as an inactive standby path when the identifier received from the virtualization control apparatus matches with an identifier of the first storage device,
wherein the commanding unit requests the identifier of the real storage device assigned to the second storage device by sending a query twice to the virtualization control apparatus as to the storage space accessible via the second path; and
the virtualization control apparatus recognizes data migration when there are two queries from the commanding unit as to the storage space relating to a same path and the virtualization control apparatus informs the setting unit of the identifier of the first storage device which is a real storage device identifier.

8. The information processing apparatus according to claim 7, wherein the setting unit is configured to change the first path to an inactive standby path after incorporating the second path as an inactive standby path, based on the identifier received from the virtualization control apparatus, and change the second path to an active state to permit access to the second storage device via the second path.

9. A method for controlling a storage system including an information processing apparatus that makes access to a first storage device via a first path and a virtualization control apparatus that controls access to a second storage device via a second path, the virtualization control apparatus being provided by virtualizing the first storage device, the method comprising:
sending a query from the information processing apparatus to the virtualization control apparatus, the query requesting information about a storage space that is accessible via the second path;
sending an identifier of the first storage device from the virtualization control apparatus to the information processing apparatus in response to the query from the information processing apparatus; and
incorporating, by the information processing apparatus, the second path as an inactive standby path when the identifier received as a response to the query matches with an identifier of the first storage device accessible via the first path, wherein
the sending of the query is executed twice, thus sending first and second queries from the information processing apparatus to the virtualization control apparatus;
the method further comprises sending an identifier of the second storage device from the virtualization control apparatus to the information processing apparatus in response to the first query;
the sending of the identifier of the first storage device from the virtualization control apparatus is executed in response to the second query;
the incorporating of the second path as an inactive standby path is executed when the identifier received as a response to the second query matches with an identifier of the first storage device accessible via the first path; and
the virtualization control apparatus recognizes data migration when there are two queries from the information processing apparatus as to the storage space relating to a same path and the virtualization control apparatus informs the information processing apparatus of the identifier of the first storage device which is a real storage device identifier.

10. The method according to claim 9, further comprising:

changing, after the incorporating of the second path as an inactive standby path, the first path to an inactive standby path, and the second path to an active state, to permit access to the second storage device via the second path; and executing, by the virtualization control apparatus, data migration from the first storage device to a destination storage device, while allowing the second control unit to continue controlling access to the second storage device.

11. The method according to claim 10, further comprising changing assignment of a real storage space for the second storage device from the first storage device to the destination storage device, upon completion of the data migration.

* * * * *